(12) United States Patent
Jang

(10) Patent No.: US 11,394,671 B2
(45) Date of Patent: Jul. 19, 2022

(54) METHOD FOR PROVIDING TRANSACTION HISTORY-BASED SERVICE AND ELECTRONIC DEVICE THEREFOR

(71) Applicant: Samsung Electronics Co., Ltd., Gyeonggi-do (KR)

(72) Inventor: Dong-Ho Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 16/339,809

(22) PCT Filed: Sep. 28, 2017

(86) PCT No.: PCT/KR2017/010818
§ 371 (c)(1),
(2) Date: Apr. 5, 2019

(87) PCT Pub. No.: WO2018/066889
PCT Pub. Date: Apr. 12, 2018

(65) Prior Publication Data
US 2020/0044997 A1 Feb. 6, 2020

(30) Foreign Application Priority Data

Oct. 7, 2016 (KR) .......................... 10-2016-0129923

(51) Int. Cl.
*G06Q 30/00* (2012.01)
*H04L 51/046* (2022.01)
(Continued)

(52) U.S. Cl.
CPC ....... *H04L 51/046* (2013.01); *G06Q 30/0633* (2013.01); *H04L 51/02* (2013.01); *H04L 51/16* (2013.01); *H04W 4/14* (2013.01)

(58) Field of Classification Search
CPC ....... H04L 51/046; H04L 51/02; H04L 51/16; G06Q 30/0633; H04W 4/14
(Continued)

(56) References Cited

U.S. PATENT DOCUMENTS 6,629,081 B1 * 9/2003 Cornelius .............. G06Q 20/04
705/30
2004/0140975 A1 7/2004 Saito et al.
(Continued)

FOREIGN PATENT DOCUMENTS

JP 2004-139440 A 5/2004
KR 10-2006-0116949 A 11/2006
(Continued)

OTHER PUBLICATIONS

"Hello, clients" . . . Facebook, opening a shopping helper chatbot to the public; Date: Apr. 13, 2016; 4 pages.

*Primary Examiner* — Imad Hussain
(74) *Attorney, Agent, or Firm* — Cha & Reiter, LLC

(57) ABSTRACT

The present invention provides a transaction history-based unmanned chatting service, and an operation method of an electronic device comprises the steps of: displaying at least one payment history; displaying a post-payment service list with respect to a payment history, which is selected by a user input, among at least one of payment histories; and connecting an unmanned chatting service corresponding to the post-payment service, which is selected by the user, in the service list.

18 Claims, 36 Drawing Sheets

(51) Int. Cl.
    *G06Q 30/06*     (2012.01)
    *H04L 51/02*     (2022.01)
    *H04L 51/00*     (2022.01)
    *H04W 4/14*     (2009.01)

(58) Field of Classification Search
    USPC .................................................. 705/26.61
    See application file for complete search history.

(56) References Cited

U.S. PATENT DOCUMENTS

| | | | |
|---|---|---|---|
| 2005/0240477 A1* | 10/2005 | Friday | G06Q 30/0234 |
| | | | 705/14.33 |
| 2012/0226570 A1* | 9/2012 | Kemp | G06Q 30/0623 |
| | | | 705/26.1 |
| 2013/0346175 A1* | 12/2013 | Muthu | G06Q 30/0207 |
| | | | 705/14.23 |
| 2015/0052032 A1 | 2/2015 | Aharoni | |
| 2016/0104188 A1* | 4/2016 | Glyman | G06Q 30/0234 |
| | | | 705/14.34 |
| 2016/0140638 A1 | 5/2016 | Ennals et al. | |
| 2016/0371702 A1 | 12/2016 | Kim et al. | |
| 2018/0218372 A1* | 8/2018 | Prendki | G06Q 30/0643 |

FOREIGN PATENT DOCUMENTS

| | | |
|---|---|---|
| KR | 10-2007-0091433 A | 9/2007 |
| KR | 10-1057016 B1 | 8/2011 |
| KR | 10-1634427 B1 | 7/2016 |

\* cited by examiner

METHOD FOR PROVIDING TRANSACTION HISTORY-BASED SERVICE AND ELECTRONIC DEVICE THEREFOR

CLAIM OF PRIORITY

This application is a National Phase Entry of PCT International Application No. PCT/KR2017/010818, which was filed on Sep. 28, 2017 and claims a priority to Korean Patent Application No. 10-2016-0129923, which was filed on Oct. 7, 2016, the contents of which are incorporated herein by reference.

TECHNICAL FIELD

Various embodiments of the present invention relate to a method and an apparatus for providing various services after payment based on transaction history in an electronic device.

BACKGROUND ART

As a portable electronic device such as a smart phone or a tablet spreads and such an electronic device evolves from a simple communication medium into a device enabling various functions such as communication, distribution, Internet, and payment, changes occur across industries such as finance, distribution, and culture. In particular, spread of a mobile payment scheme through the electronic device in the payment field is causing new changes in the central axis of the payment method which has been implemented from cash to a plastic card.

A mobile payment service may be used to indicate a service which performs purchase payment of services and goods online and offline through the portable electronic device. Such a mobile payment service is gradually expanding in terms of user convenience. Hence, the area of the mobile payment service is expanding to easily identify transaction history and to process services such as refund or exchange after the transaction at the portable electronic device.

DISCLOSURE OF INVENTION

Technical Problem

Various embodiments of the present invention provide an apparatus and a method for providing more convenient a post-payment service based on transaction history.

Various embodiments of the present invention provide an apparatus and a method for providing a different post-payment service according to a seller.

Various embodiments of the present invention provide an apparatus and a method for providing a transaction history-based post-payment service through an unmanned chatting service.

Various embodiments of the present invention provide an apparatus and a method for connecting an appropriate unmanned chatting service according to a selected post-payment service and a seller.

Solution to Problem

According to various embodiments of the present invention, an operating method of an electronic device includes displaying at least one payment history, displaying a post-payment service list for a payment history selected by a user input among the at least one payment history, and connecting an unmanned chatting service corresponding to the post-payment service selected by a user in the service list.

According to various embodiments of the present invention, an electronic device includes a display for displaying at least one payment history, and displaying a post-payment service list for a payment history selected by a user input among the at least one payment history, and a control unit for controlling an unmanned chatting service connection corresponding to a post-payment service selected by a user in the service list.

Advantageous Effects of Invention

A method and an electronic device according to various embodiments may, if performing a payment at a mobile device and then using a post-payment service such as refund and exchange, reduce inconvenience in requesting/processing the post-payment service on a seller site, by automatically identifying seller information. In addition, since it is difficult and complicated to connect an automatic response service (ARS) of the seller, user's convenience may be improved by displaying user's transaction history and the post-payment service using a user interface (UI).

BEST MODE FOR CARRYING OUT THE INVENTION

Figure 1:
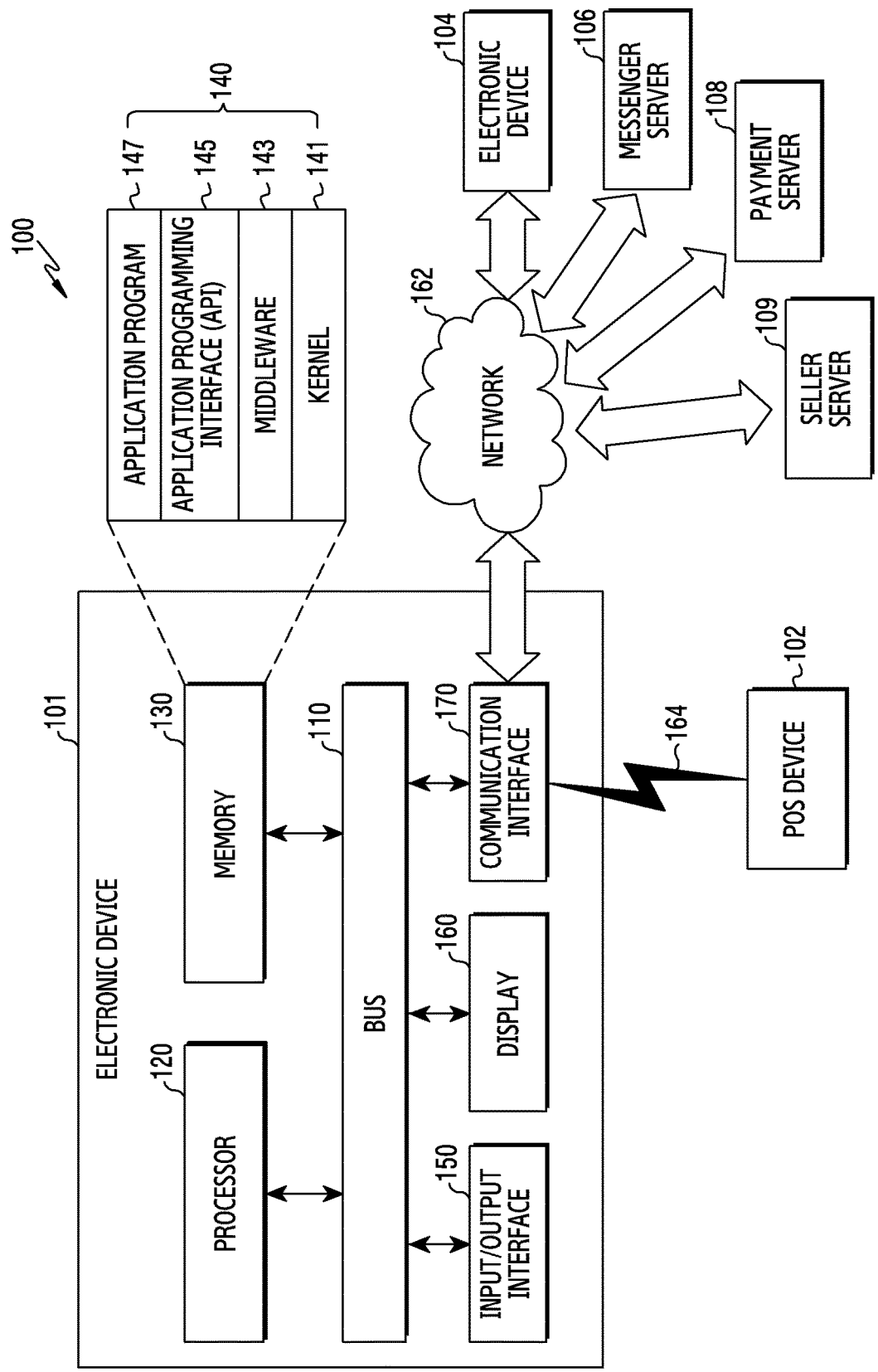
FIG. 1 illustrates an electronic device in a network environment according to various embodiments of the present invention.

Embodiments of the present disclosure are described in detail with reference to the accompanying drawings. It should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. A singular expression may include a plural expression unless they are definitely different in a context. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

FIG. 1 illustrates an electronic device in a network environment according to various embodiments of the present invention.

Referring to FIG. 1, an electronic device 101 resides in a network environment 100. The electronic device 101 can include a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control.

The input/output interface 150, for example, can deliver commands or data inputted from a user or another external device to other component(s) of the electronic device 101, or output commands or data inputted from the other component (s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part.

The communication interface 170, for example, can set a communication between the electronic device 101 and an external device (e.g., pos device 102, an external electronic device 104, servers 106, 108, 109. For example, the communication interface 170 can communicate with the external device (e.g., the external electronic device 104 or the servers 106, 108, 109 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

The POS device 102 may be responsible for the mobile device and the payment processing. The POS device 102 is an electronic device installed at a point of sale, and may be a device for collecting, storing, and transmitting product information or customer information of the point of the sale. According to various embodiments, the electronic device 101 may transmit necessary information for the payment to the POS device 102. The POS device 102 may proceed with a payment through various methods such as non-contact payment using a magnetic secure transmission (MST) scheme or an NFC scheme or payment using a quick response (QR) code, or barcode. The processing of the corresponding payment may be requested by requesting a processed payment request from the payment server 108. The POS device 102 may receive its processing result from the payment server 108 and forward to the payment application.

The external electronic device 104 may be of the same as or a different type from the electronic device 101. According to various embodiments, all or part of the operations executed at the electronic device 101 may be executed by one or more other electronic devices (e.g., the electronic device 104). According to one embodiment, if the electronic device 101 performs a specific function or service automatically or by request, instead of or in addition to performing the function or the service by the electronic device 101, the electronic device 101 may request at least part of the related function from other device (e.g., the electronic device 104). The other electronic device (e.g., the electronic device 104) may perform the requested function or an additional function, and provide its result to the electronic device 101. The electronic device 101 may provide the requested function or service by processing the received result as it is or additionally. In doing so, for example, cloud computing, distributed computing, or client-server computing techniques may be used.

The messenger server 106 may be connected with a messenger application to deliver a message.

The payment server 108 may transmit and receive payment related information to and from a device over the network. The payment server 108 may exchange the payment related information with the payment application and, and store or manage card information. The payment server 108 may manage a user's account, and manage payment information. The payment server 108 (may be a single server or a network which combines a plurality of servers) may issue and manage a token. The token may be information used for the payment instead of physical card information (e.g., card number, card user, etc.). For example, the token may be encrypted numbers which replace card identification number (primary account number (PAN)). Using the token, the payment server 108 may proceed with credit card payment without transmitting and receiving credit card number or user information over the network. The token may be used on a temporary basis at a specific affiliated store, a specific channel, or a specific device. If a payment request is received from the POS device 102 or the payment application or other application installed on the electronic device requests the payment through the seller server 109, the payment server 108 may proceed with identifying and processing the corresponding request. The payment server 108, for example, may share user-specific payment information with the messenger server 106. According to other embodiment, the payment server 108 may include a module which provides a messenger function therein, or the messenger server 106 may include a module which provides the payment function therein.

The electronic device 101 may receive a service or exchange messages in association with various external servers over a wired or wireless network. According to various embodiments, the electronic device 101 may be coupled to at least one of the messenger server 106, the payment server 108, or the seller server 109 over the wired or wireless network.

Figure 2:
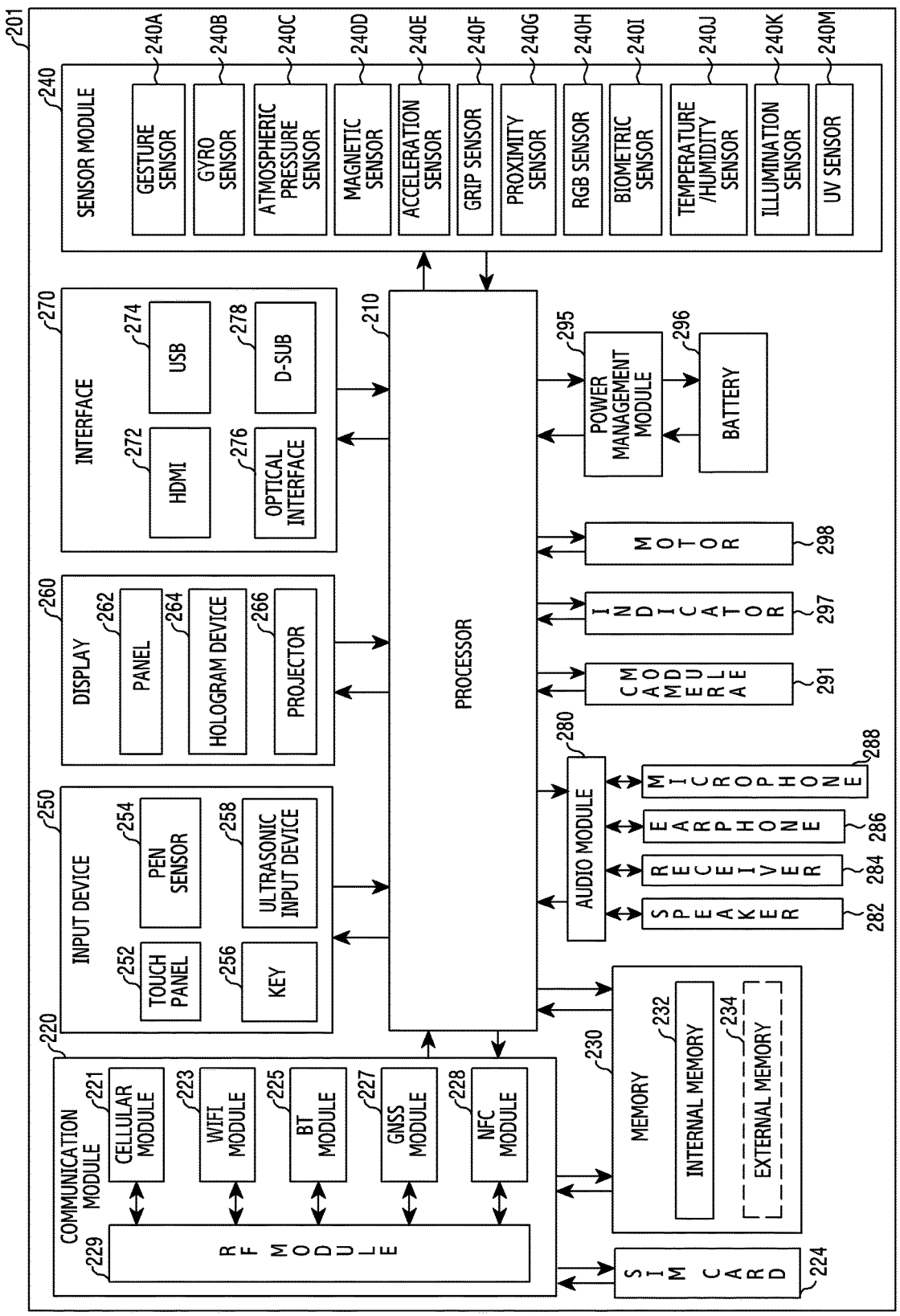
FIG. 2 illustrates a block diagram of an electronic device according to various embodiments of the present invention.

FIG. 2 illustrates a block diagram of an electronic device according to various embodiments of the present invention.

An electronic device 201, for example, may include all or part of the electronic device 101 of FIG. 1. The electronic device 201 may include one or more processors (e.g., an AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210, for example, may control a plurality of hardware or software components connected to the processor 210, and perform various data processing and operations by executing an OS or an application program. The processor 210 may be implemented with, for example, a system on chip (SoC). According to one embodiment, the processor 210 may further include a graphic processing unit (GPU) and/or an image signal processor (ISP). The processor 210 may include at least part (e.g., a cellular module 221) of the components shown in FIG. 2. The processor 210 may load and process a command or data received from at least one of other components (e.g., a nonvolatile memory) into a volatile memory, and store resultant data in the nonvolatile memory. The processor 210 may correspond to a control unit 403 of FIG. 4.

In addition, the processor 210 may control function execution of a messenger 385, or a payment 386 application to be described.

In addition, the processor 210 may control to display payment history information or a post-payment service list obtained from the memory 230 or an external server such as a payment server through the display 260.

In addition, the processor 210 may determine an unmanned chatting service to be connected based on at least one of the post-payment service selected by a user's input and seller information.

The communication module 220 may have the same or similar configuration to, for example, the communication interface 170 of FIG. 1. The communication module 220 may include, for example, the cellular module 221, a WiFi module 223, a Bluetooth module 225, a GNSS module 226, an MST module 227, an NFC module 228 and an RF module 229.

The cellular module 221, for example, may provide voice call, video call, text service, or Internet service through a communication network. According to one embodiment, the cellular module 221 may perform identification and authentication of the electronic device 201 in a communication network by using a subscriber identification module (e.g., a subscriber identification module (SIM) card) 224. According to one embodiment, the cellular module 221 may perform at least part of functions provided by the processor 210. According to one embodiment, the cellular module 221 may further include a CP. According to an embodiment, at least some (e.g., two or more) of the cellular module 221, the WiFi module 223, the Bluetooth module 225, the GNSS module 227, or the NFC module 228 may be included in one Integrated Circuit (IC) or an IC package.

The RF module 229, for example, may transmit and receive a communication signal (e.g., an RF signal). The RF module 229, for example, may include a transceiver, a power amp module (PAM), a frequency filter, a Low Noise Amplifier (LNA), or an antenna. According to another embodiment, at least one of the cellular module 221, the WiFi module 223, the Bluetooth module 225, the GNSS module 226, or the NFC module 228 may transmit and receive an RF signal through a separate RF module.

The WiFi module 223 may indicate, for example, a module for establishing a wireless Internet access or a wireless LAN link with other external device (e.g., the other electronic device 102 or the server 106, etc.). The WiFi module 223 may be embedded in or disposed outside the electronic device 400. The wireless Internet technology may use WiFi, Wibro, world interoperability for microwave access (WiMax), high speed downlink packet access (HSDPA), or millimeter Wave (mmWave). In association with the other external device (e.g., the other electronic device 102) connected to the electronic device over the network (e.g., the wireless Internet network) (e.g., the network 162), the WiFi module 223 may transmit various data of the electronic device to outside or receive from the outside. The WiFi module 223 may constantly maintain an on state, or may turn on/turn off according to setting of the electronic device or a user input.

The Bluetooth module 225 and the NFC module 228 may indicate, for example, short range communication modules for perform short range communication. The short range communication technology may use Bluetooth, Bluetooth low energy (BLE), radio frequency identification (RFID), infrared communication (IrDA), ultra wideband (UWB), Zigbee, or NFC. In association with the other external device connected to the electronic device over the network (e.g., short range communication network), the short range communication module may transmit or receive various data of the electronic device to or from an external device. The short range communication module may constantly maintain an on state, or may turn on/turn off according to the setting of the electronic device or a user input.

The NFC module 228 may, for example, if receiving a specific message from an external device (e.g., the POS device 102), transmit payment information to the external device (e.g., the POS device 102).

The subscriber identification module 224, for example, may include a card including a subscriber identification module or an embedded SIM, and may contain unique identification information (e.g., integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, hard drive, or solid state drive (SSD)). The external memory 234 may include flash drive, for example, compact flash (CF), secure digital (SD), micro SD, mini SD, extreme digital (xD), multi-media card (MMC), or memory stick. The external memory 234 may be functionally or physically connected to the electronic device 201 through various interfaces.

In addition, the memory 230 may store payment information and payment history information for mobile payment.

The sensor module 240 may, for example, measure physical quantities or detect an operating state of the electronic device 201, and thus convert the measured or detected information into electrical signals. The sensor module 240 may include at least one of, for example, a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green, blue (RGB) sensor), a medical sensor 240I, a temperature/humidity sensor 240J, an illuminance sensor 240K, or an ultra violet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling at least one sensor therein. In an embodiment, the electronic device may further include, as part of the processor 210 or individually, a processor configured to control the sensor module 240, and thus control the sensor module 240 while the processor 210 is sleeping.

The input device 250 may include, for example, a touch panel 252, a (digital) pen sensor 254, a key 256, or an ultrasonic input device 258. The touch panel 252 may use at least one of, for example, capacitive, resistive, infrared, or ultrasonic methods. Additionally, the touch panel 252 may further include a control circuit. The touch panel 252 may further include a tactile layer, to provide a tactile response to a user. The (digital) pen sensor 254 may, for example, be part of a touch panel or include a separate recognition sheet. The key 256 may include, for example, a physical button, a touch key, an optical key, or a keypad. The ultrasonic input device 258 may detect ultrasonic waves generated from an input means through a microphone 288, and identify data corresponding to the detected ultrasonic waves. The necessary card information (e.g., a card company, a card number, a card valid date or a card owner name, etc.) for the mobile payment may be inputted by the user to the electronic device 201 through the input device 250 (e.g., the touch panel 252, the pen sensor 254, the ultrasonic input device 258, or the microphone 288).

The display 260 (e.g., the display 160) may include a panel 262, a hologram device 264, a projector 266, and/or a control circuit for controlling them.

The panel 262 may be implemented to be, for example, flexible, transparent, or wearable. The panel 262 and the touch panel 252 may be configured as one or more modules. According to one embodiment, the panel 262 may include a pressure sensor (or a force sensor) for measuring a pressure level of a user touch. The pressure sensor may be integrated with the touch panel 252, or implemented as one or more sensors separately from the touch panel 252. The hologram device 264 may show three-dimensional images in the air by using the interference of light. The projector 266 may display an image by projecting light on a screen. The screen, for example, may be placed inside or outside the electronic device 201.

The interface 270 may include, for example, an HDMI 272, a USB 274, an optical interface 276, or a D-subminiature (D-sub) 278. The interface 270 may be included in, for example, the communication interface 170 of FIG. 1. Additionally or alternatively, the interface 270 may include a mobile high-definition link (MHL) interface, a SD card/MMC interface, or an IrDA standard interface.

The audio module 280, for example, may convert sounds into electrical signals and vice versa. At least some components of the audio module 280 may be included in, for example, the input/output interface 150 of FIG. 1. The audio module 280 may process sound information inputted or outputted through, for example, a speaker 282, a receiver 284, an earphone 286, or the microphone 288. The audio module 280 may perform functions for transmitting an audio signal inputted from the processor 210 to an output device (e.g., the speaker 282, the receiver 284 or the earphone 286), and forwarding an audio signal such as voice inputted from an input device (e.g., the microphone 288) to the processor 210. The audio module 280 may convert and output voice/sound data as an audible sound through the output device under control of the processor 210, and convert an audio signal such as voice received from the input device into a digital signal and forward it to the processor 210.

The speaker 282 or the receiver 284 may output audio data received from the communication module 220 or stored in the memory 230. The speaker 282 or the receiver 284 may output sound signals relating to various operations (functions) performed in the electronic device. The microphone 288 may receive and process an external sound signal into electric voice data. Various noise reduction algorithms may be realized in the microphone 288 in order to reduce noise generated in receiving external sound signal. The microphone 288 may input audio streaming such as voice command.

The camera module 291, for example, as a device for capturing still images and videos, may include one or more image sensors (e.g., a front sensor or a rear sensor), a lens, an ISP, or a flash (e.g., an LED or a xenon lamp) according to one embodiment. The camera module 291 may be used to acquire card information by capturing a card which is required for the payment. The camera module 291 may recognize the card information (e.g., a card company, a card number, a card valid date, or a card owner name, etc.) written on the card through optical character recognition (OCR) functionality.

The power management module 295, for example, may manage power of the electronic device 201. According to one embodiment, the power management module 295 may include, for example, a power management IC (PMIC), a charger IC, or a battery or fuel gauge. The PMIC may have a wired and/or wireless charging method. The wireless charging method may include, for example, a magnetic resonance method, a magnetic induction method, or an electromagnetic method, and may further include an additional circuit for the wireless charging, for example, a coil loop, a resonant circuit, or a rectifier. The battery gauge may measure, for example, the remaining capacity of the battery 296, or a voltage, current, or temperature during charging. The battery 296 may include, for example, a rechargeable battery and/or a solar battery.

The indicator 297 may display a specific state of the electronic device 201 or part thereof (e.g., the processor 210), for example, a booting state, a message state, or a charging state. The motor 298 may convert electrical signals into mechanical vibration and generate a vibration or a haptic effect. The electronic device 201 may include, for example, a mobile TV supporting device (e.g., a GPU) for processing media data according to standards such as digital multimedia broadcasting (DMB), digital video broadcasting (DVB), or mediaFlo™.

Each of the above-described components disclosed in this document may be configured with one or more components, and the name of a corresponding component may vary according to a type of the electronic device. According to various embodiments, the electronic device (e.g., the electronic device 101, 201) may omit some component, include an additional component, or be configured as one entity by combining some of the components, wherein functions of previous corresponding components are performed identically.

Figure 3:
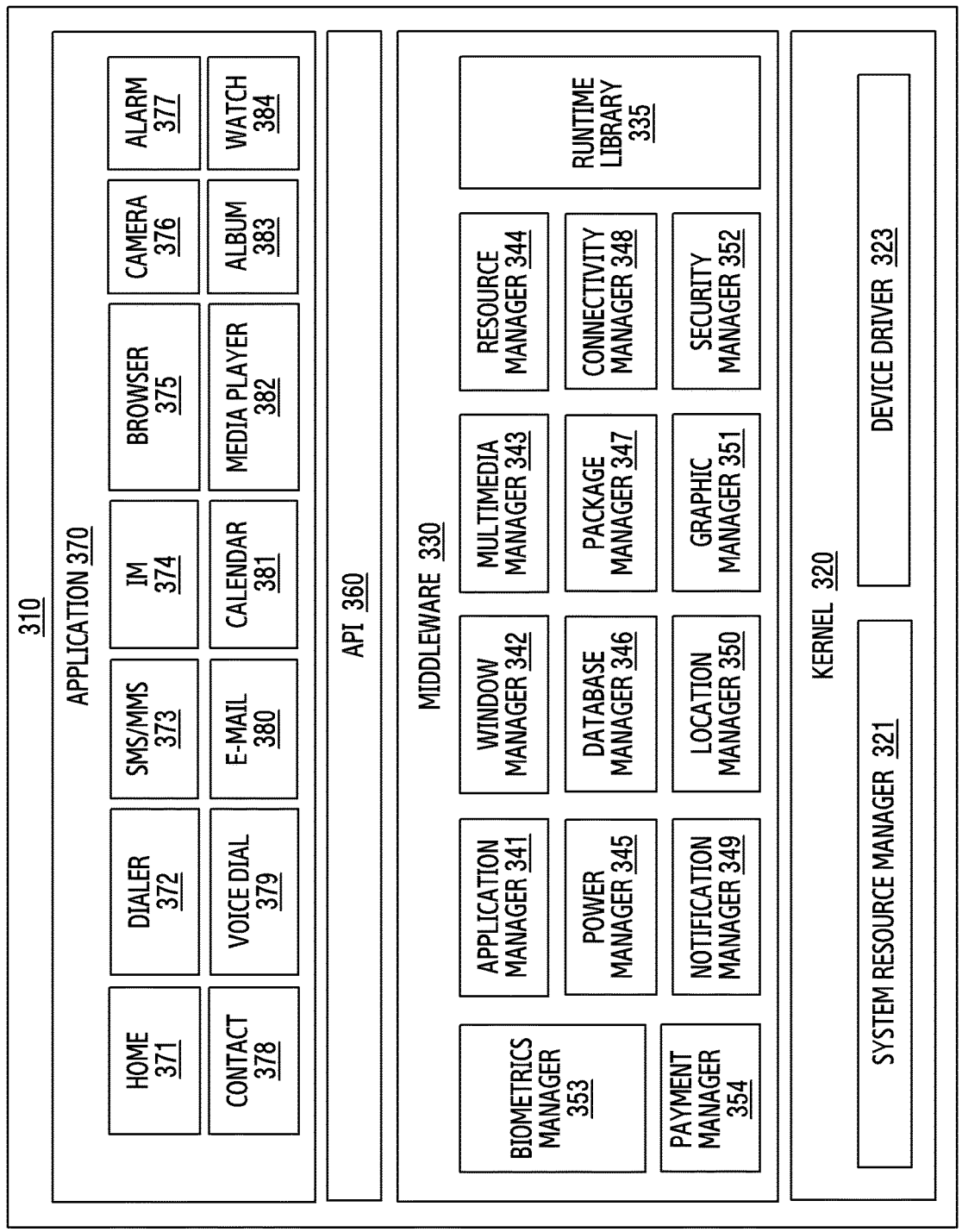
FIG. 3 illustrates a block diagram of a program module according to various embodiments of the present invention.

FIG. 3 is a block diagram of a program module according to various embodiments of the present invention.

According to one embodiment, a program module 310 (e.g., the program 140) may include an OS for controlling resources relating to an electronic device (e.g., the electronic device 101) and/or various applications (e.g., the application program 147) running on the OS. The OS may include, for example, Android™, iOS™, Windows™, Symbian™, Tizen™, or Bada™. Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least part of the program module 310 may be preloaded on the electronic device, or may be downloaded from an external electronic device (e.g., the electronic device 104, the messenger server 106, the payment server 108, the seller server 109, etc.).

The kernel 320 may include, for example, a system resource manager 321 and/or a device driver 323. The system resource manager 321 may control, allocate, or retrieve a system resource. According to one embodiment, the system resource manager 321 may include a process management unit, a memory management unit, or a file system management unit. The device driver 323 may include, for example, a display driver, a camera driver, a Bluetooth driver, a sharing memory driver, a USB driver, a keypad driver, a WiFi driver, an NFC driver, an MST driver, an audio driver, or an inter-process communication (IPC) driver.

The middleware 330, for example, may provide a function commonly required by the application 370, or may provide various functions to the application 370 through the API 360 in order to allow the application 370 to efficiently use a limited system resource inside the electronic device. According to one embodiment, the middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, a biometrics manager 353, or a payment manager 354.

The runtime library 335 may include, for example, a library module used by a complier to add a new function through a programming language while the application 370 is running. The runtime library 335 may perform input/output management, manage memory management, or arithmetic function processing.

The application manager 341, for example, may manage a life cycle of the application 370. The window manager 342 may manage a GUI resource used in a screen. The multimedia manager 343 may recognize a format required for playing media files and encode or decode the media file by using a codec in a corresponding format. The resource manager 344 may manage a source code of the application 370 or a memory space. The power manager 345 may, for example, manage capacity or power of the battery and provide power information required for operating the electronic device. According to one embodiment, the power manager 345 may operate together with a basic input/output system (BIOS). The database manager 346 may, for example, create, search, or modify a database used in the application 370. The package manager 347 may manage installation or updating of an application distributed as a package file.

The connectivity manger 348 may manage, for example, a wireless connection. For example, the connectivity manger 348 is responsible for a function for connecting the messenger 385 application to the messenger server 106, or connecting the payment 386 application to the payment server 108. The notification manager 349 may provide, for example, an event, such as incoming messages, appointments, and proximity alerts, to the user. The location manager 350 may, for example, manage location information of the electronic device. The graphic manager 351 may, for example, manage a graphic effect to be provided to the user or a user interface relating thereto. The security manager 352 may provide, for example, system security or user authentication. If performing a user authentication function, the biometrics manager 353 may, for example, process biometrics information such as fingerprint, iris, and so on. For example, to acquire or store biometrics information if applications in the electronic device 101 perform a function such as user authentication, the biometrics manager 353 may forward to the biometrics driver, receive and process a result, and then forward the result to the application. The biometrics manager 353 may be included as part of the security manager 352. The payment manager 354 may support necessary operations for the payment function, and if the payment is requested, may forward the payment information through the NFC driver or the MST driver.

According to one embodiment, the middleware 330 may include a telephony manager for managing a voice or video call function of the electronic device, or a middleware module for forming a combination of the functions of the above-described components. According to one embodiment, the middleware 330 may provide a module specialized for each type of OS. The middleware 330 may dynamically delete part of the existing components or add new components.

The API 360, for example, as a set of API programming functions, may be provided as a different configuration according to the OS. For example, Android or iSO may provide one API set for each platform, and Tizen may provide two or more API sets for each platform.

The application 370 may include, for example, a home 371, a dialer 372, an SMS/multimedia messaging system (MMS) 373, an instant message (IM) 374, a browser 375, a camera 376, an alarm 377, a contact 378, a voice dial 379, an e-mail 380, a calendar 381, a media player 382, an album 383, a watch 384, a messenger 385, a payment 386, health care (e.g., measure an exercise amount or blood sugar level), or environmental information (e.g., air pressure, humidity, or temperature information) provision application.

The messenger 385 application may include an application which provides a chatting service with other device by connecting to the messenger server 106. According to one embodiment, the messenger 385 application may include an artificial intelligence message module such as chatting bot.

The payment 386 application may provide a user interface (UI) or a user experience (UX) regarding the payment. For example, the user interface regarding the payment 386 may include a wallet UI/UX. For example, the payment application may provide a UI regarding card registration, payment, or transaction. The payment 386 application may provide, for example, an interface regarding the card registration through a character reader (e.g., OCR) or an external input (e.g., a user input). In addition, the payment 386 application may provide, for example, an interface regarding the user authentication through inadequate customer identification and verification (ID&V).

According to one embodiment, the application 370 may include an information exchange application for supporting information exchange between the electronic device and an external electronic device. The information exchange application may include, for example, a notification relay application for forwarding specific information to the external electronic device, or a device management application for managing the external electronic device. For example, the notification relay application may forward notification information from another application of the electronic device to the external electronic device, or receive and forward notification information from the external electronic device to the user. The device management application, for example, may install, delete, or update a function (e.g., turn-on/turn off of the external electronic device itself (or some components) or display brightness (or resolution) adjustment) of the external electronic device which communicates with the electronic device, or an application operating in the external electronic device.

According to one embodiment, the application 370 may include a designated application (e.g., a health care application of a mobile medical device) according to a property of the external electronic device. According to one embodiment, the application 370 may include an application received from the external electronic device. At least part of the program module 310 may be implemented (e.g., executed) with software, firmware, hardware (e.g., the processor 210), or a combination of at least two of them, and include a module, a program, a routine, a set of instructions, or a process for executing one or more functions.

The term "module" used in this document may include a unit including hardware, software, or firmware, and may be interchangeably used with terms such as, for example, unit, logic, logical block, component, circuit, and the like. The "module" may be a minimum unit of an integral component or for performing one or more functions or a part thereof. The "module" may be mechanically or electrically implemented, and may include, for example, an application-specific integrated circuit (ASIC) chip, a field-programmable gate arrays (FPGAs), or a programmable-logic device, which are known or will be developed to perform certain operations. At least some parts of a device (e.g., modules or functions thereof) or a method (e.g., operations) according to various embodiments may be implemented with instructions stored in a computer readable storage medium (e.g., the memory 130) as a program module. If the instruction is executed by a processor (e.g., the processor 120), the processor may perform a function corresponding to the instruction.

The computer readable recording medium may include a hard disk, a floppy disc, a magnetic medium (e.g., a magnetic tape), optical storage media (e.g., a compact disc-ROM (CD-ROM) or a DVD, magnetic-optic media (e.g., a floptical disc)), and an internal memory. The instruction may include code created by a compiler or code executable by an interpreter. The module or the program module according to various embodiments may include at least one or more components of the aforementioned components, or may omit some of them, or may further include other components.

Operations performed by a module, a program module, or other components according to various embodiments may be executed in a sequential, parallel, repetitive, or heuristic manner, or some of the operations may be executed in a different order or may be omitted, or other operations may be added.

The electronic device according to various embodiments of the present invention may include any device which supports the communication functionality and uses one or more of various processors such as AP, CP, GPU, and CPU. For example, the electronic device according to various embodiments may include any information communication device which supports the communication functionality, a multimedia device, a wearable device, and Internet of things (IoT) device, and their application devices.

Hereafter, an operating method and an apparatus according to various embodiments of the present invention are explained by referring to the attached drawings. However, various embodiments of the present invention are not restricted by or limited to contents which will be described below and therefore, and it should be noted that they may be applied to various embodiments based on the embodiments to be described below. In embodiments of the present invention described below, a hardware approach will be described as an example. However, since the various embodiments of the present invention include a technology using both of hardware and software, various embodiments of the present invention do not exclude a software-based approach.

Figure 4:
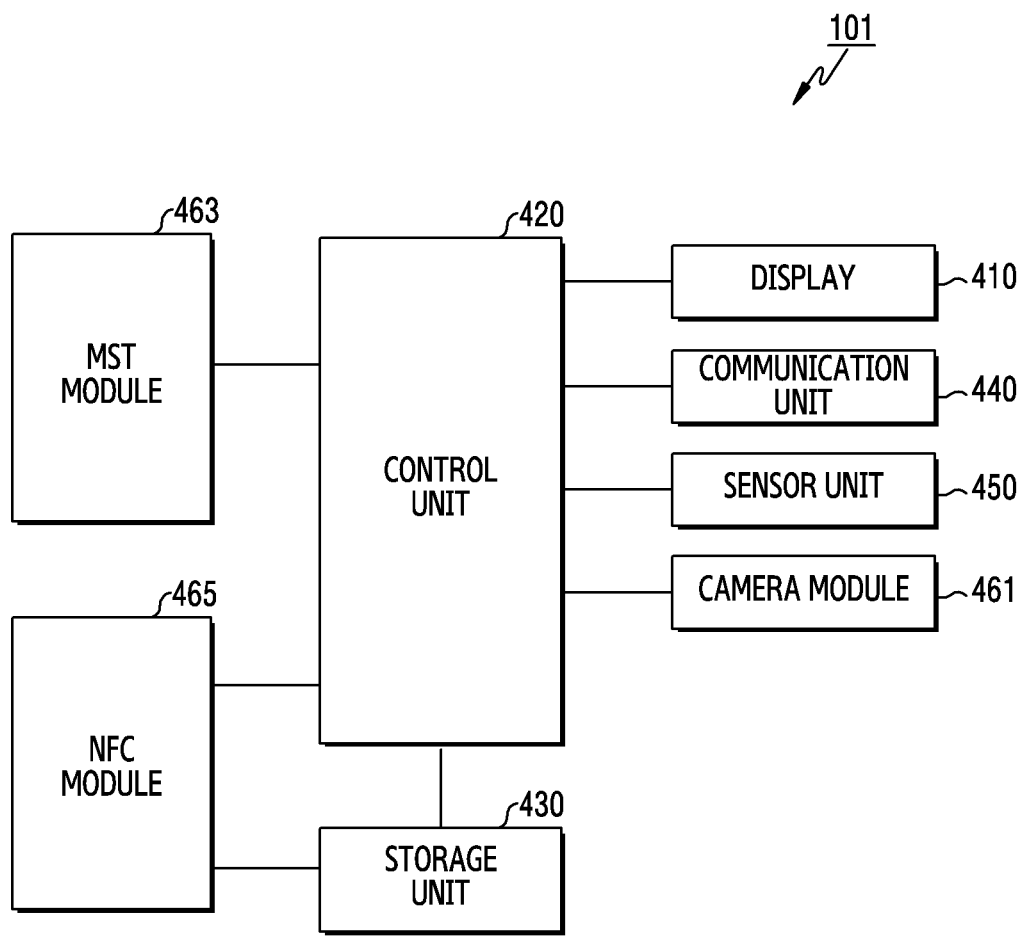
FIG. 4 illustrates a functional configuration of an electronic device according to various embodiments of the present invention.

FIG. 4 illustrates a functional configuration of an electronic device according to various embodiments of the present invention. A term such as 'portion' '~er' used in the following indicates a unit for processing at least one function or operation, and may be implemented using hardware, software, or a combination of hardware and software.

Referring to FIG. 4, the electronic device 101 includes a display 410, a control unit 420, a storage unit 430, a communication unit 440, a sensor unit 450, a camera module 461, an MST module 463, and an NFC module 465.

The display unit 410 performs functions for outputting information, and detecting a user's input. The display 410 may forward a command or data inputted from the user to the control unit 420. To this end, the display 410 may include at least one hardware module for screen output and input. For example, the hardware module may include at least one of a touch screen, an LCD, an LED, an LPD, an OLED, an AMOLED, and an FLED. For example, the display 410 may provide the control unit 420 with data regarding a user's touch input (e.g., tap, press, pinch, stretch, slide, swipe, rotate, etc.) inputted through the touch screen. In particular, according to an embodiment of the present disclosure, the display 410 may display information regarding a current sub-phase determined by the control unit 420. In addition, the display 410 may output a command or data received from the control unit 420. The display 410, which displays the screen, may be referred to as a 'display unit'. Further, the display 410, which detects the user's input, may be referred to as an 'input unit'. The display 410 is the component corresponding to the display 160 of FIG. 1 and the display 260 of FIG. 2.

The control unit 420 controls the general operations of the electronic device 101. For example, the control unit 420 controls signal transmission and reception through the communication unit 440. In addition, the control unit 420 records and reads data in and from the storage unit 430. For doing so, the control unit 420 may include at least one processor or microprocessor, or may be part of a processor. In addition, some of the communication unit 440 and the control unit 420 may be referred to as a CP. For example, the control unit 420 controls various functions for displaying the payment history and providing the post-payment service according to various embodiments to be described later. In particular, the control unit 420 may determine a wireless chatting service corresponding to the post-payment service, and control the connection. The control unit 420 may include the processor 120 of FIG. 1, or the processor 210 of FIG. 2.

The storage unit 430 stores a basic program for operating the electronic device 101, application programs, and data such as setting information. In particular, the storage unit 430 may store payment information (e.g., a card company, a card number, a card valid date, a card owner name, etc.) for the mobile payment service. Also, it may store the payment history, and store the post-payment service list per seller. The storage unit 430 provides the stored data according to a request of the control unit 420.

The communication unit 440 performs functions for transmitting and receiving signals over a wireless channel. For example, the communication unit 440 performs a conversion function between a baseband signal and a bit stream in accordance with a physical layer standard of the system. Further, the communication unit 440 may include different communication modules to process signals of different frequency bands. For example, different communication standards may include BLE, Wi-Fi, WiGig, cellular networks (e.g., LTE), and so on.

According to various embodiments, the communication unit 440 may transmit and receive messages to and from a server which provides the wireless chatting service in a wired or wireless communication scheme to connect the wireless chatting service corresponding to the post-payment service.

The communication unit 440 transmits and receives signals as described above. Accordingly, the communication unit 440 may be referred to as a transmitter, a receiver or a transceiver. In addition, the transmission and the reception carried out over the radio channel in the following are used to embrace the above-stated processing by the communication unit 440.

The sensor unit 450 may include a gyro sensor, a temperature/humidity sensor, an illuminance sensor, a proximity sensor, an acceleration sensor, a medical sensor, and the like, for measuring movement or external environment of the electronic device. The sensor unit 450 may acquire user's biometric information (e.g., fingerprint or iris) to perform the function such as authentication through a biometric sensor.

The camera module 461 may acquire card information by capturing a card required for the payment. The camera module 461 may recognize the card information (e.g., a card company, a card number, a card valid date, a card owner name, etc) written on the card through the OCR function. Alternatively, the user may input the necessary card information to the electronic device using an input device (e.g., a touch panel, a pen sensor, a key, an ultrasonic input device, or a microphone input device, etc.) included in the terminal.

The MST module 463 may, for example, deliver a pulse signal of a logical low/high form including the payment information transmitted by the control unit 420. The MST module 463 may transmit the payment information by generating an induced electromotive force in a similar form to reading a magnetic card at an external device (e.g., the POS device 102). The MST module 463 may include a separate antenna coil. In this case, the MST module 463 may supply voltages of different directions to both ends of the coil antenna according to data, and control a current direction flowing through the coil antenna.

The NFC module 465 may, for example, if receiving a specific message from the external device (e.g., the POS device 102), transmit the payment information to the external device (e.g., the POS device 102).

According to various embodiments, at least one of the MST module 463 and the NFC module 465 may be included in the communication unit 440. In this case, the communication unit 440 may perform one-way communication through the MST module 463 or perform two-way communication through the NFC module 465 to transmit the payment information to the POS device 102 of FIG. 1.

Figure 5:
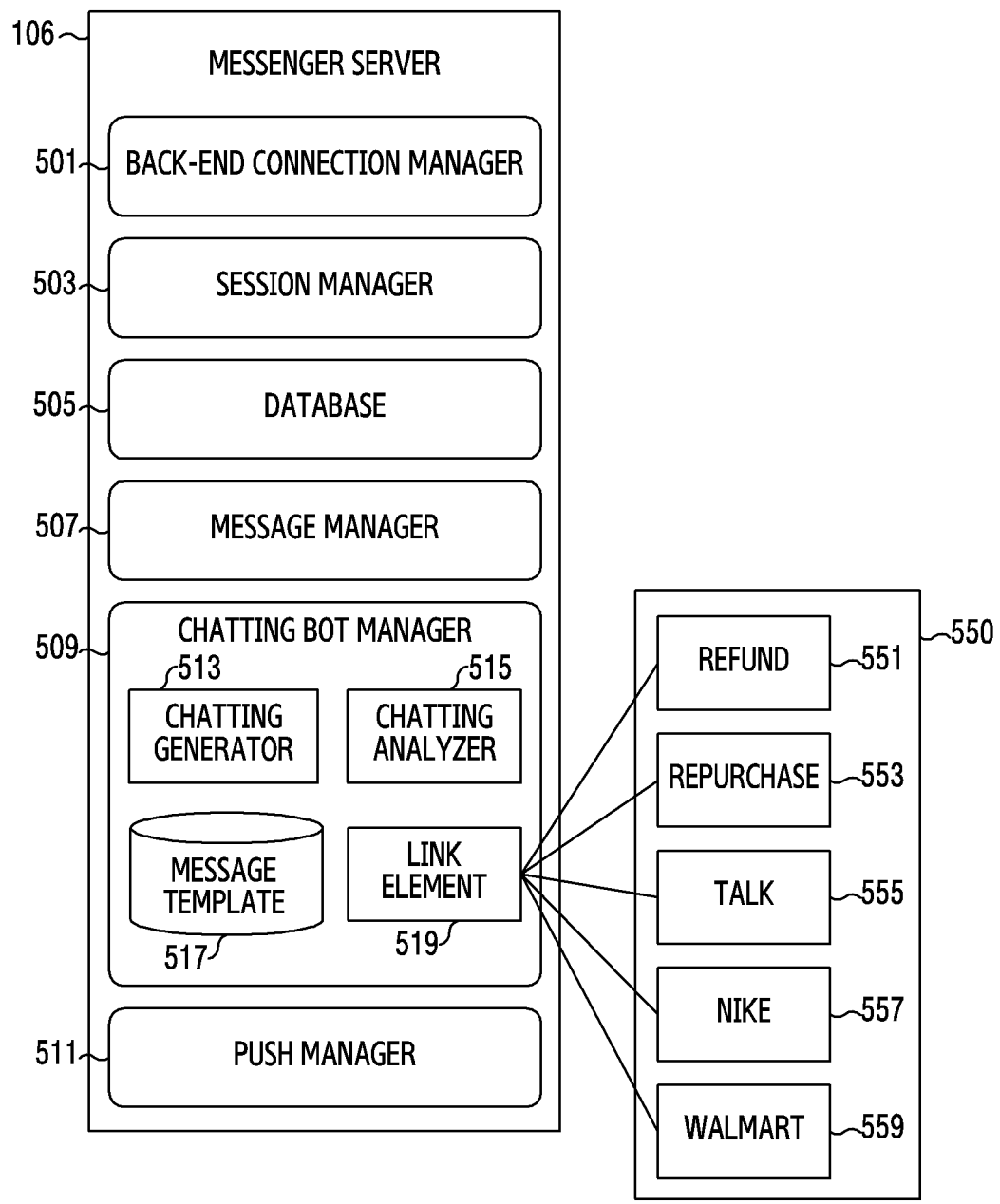
FIG. 5 illustrates a block diagram of a messenger server according to various embodiments of the present invention.

FIG. 5 illustrates a block diagram of a messenger server according to various embodiments of the present invention.

Referring to FIG. 5, a messenger server 106 may include a back-end connection manager 501, a session manager 503, a database 505, a message manager 507, a chatting bot manager 509 and a push manager 511. In various embodiments, the messenger server 106 may omit at least one of the components or further include other component.

The back-end connection manager 501 may provide, for example, connections with the messenger server 106 and proxy servers. The session manager 503 may, for example, define a session of a chatroom to provide a messenger service, and manage additional status information such as account information of members of the chatroom and transmission control protocol (TCP) connection status of the members. The database 505 may, for example, structure and manage data such as user information or conversation contents for the messenger service. The message manager 507 may, for example, store and forward normal message and control messages generated in a messaging system.

The chatting robot manager 509 may include, for example, a chatting generator 513, a chatting analyzer 515, a message template 517 and a link element 519. The chatting bots may indicate an application, a program which provides an unmanned chatting service using artificial intelligence, a device, a system for fulfilling them. According to one embodiment, the chatting robot manager 509 may be implemented to respond to a user's question according to a defined responding rule using data provided in advance.

The chatting generator 513 may, for example, write a chatting message using information of the message template 517, based on an analysis value of the chatting analyzer 515.

The chatting analyzer 515 may, for example, may serve to analyze chatting messages through natural language processing. According to one embodiment, the chatting analyzer 515 may big data process chatting messages of users, proceed with artificial intelligence self learning, and thus provide more precise analysis.

The message template 517 may, for example, provide information of chatting message types to the chatting generator 513 based on the analysis value of the chatting analyzer 515. That is, the message template 517 is a data set which includes at least one template for generating a chatting message. The message template 517 may be used to create the chatting message with a specific form by using the information provided.

The link element 519 may, for example, provide interworking with various chatting bots 550. The chatting bots 550 may include, for example, bots such as refund 551 repurchase 553, and talk 555 which are implemented according to the type of the post-payment service, and bots such as NIKE™ 557 and WALMART™ 559 which are implemented according to the seller. Herein, the chatting bots 550 may be implemented at a server (e.g., the seller server 109) operated by the seller, at a server operated by a network operator, or at a server (e.g., the payment server 108) which provides the mobile payment service.

Figure 6:
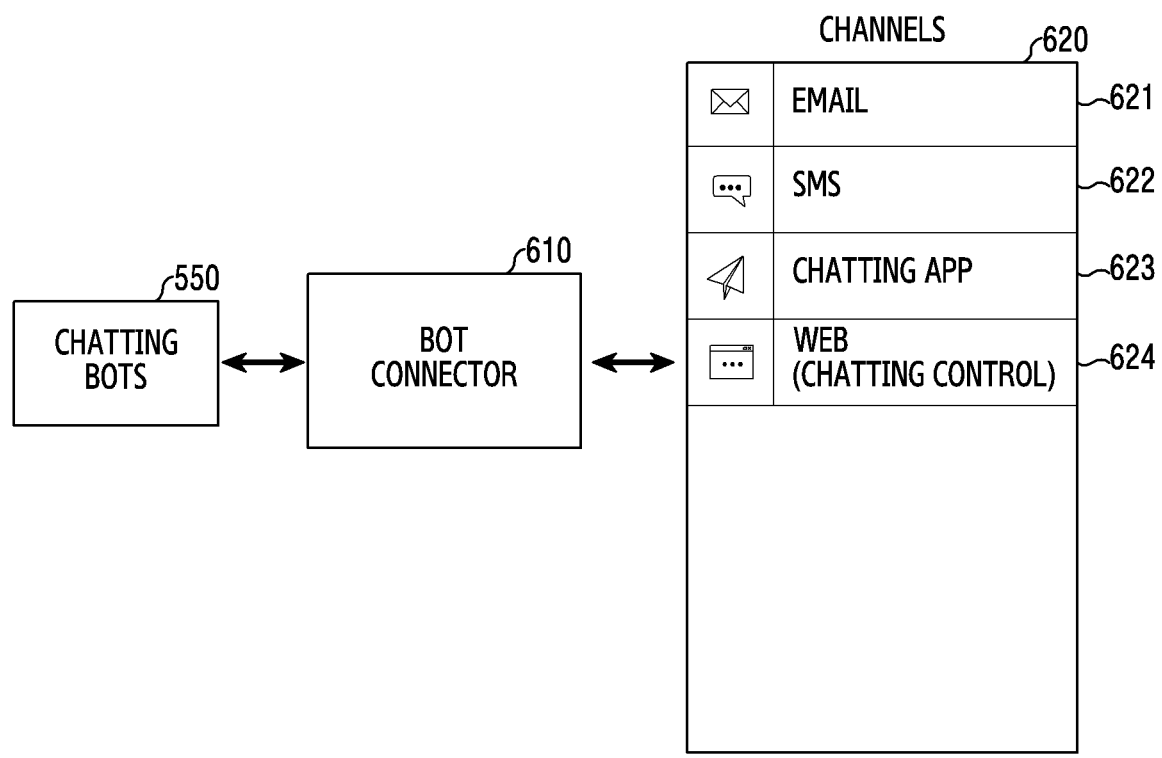
FIG. 6 illustrates connection relationships between various communication channels and unmanned chatting service bots according to various embodiments of the present invention.

FIG. 6 illustrates connection relationships between various communication channels and unmanned chatting service bots according to various embodiments of the present invention.

Referring to FIG. 6, chatting bots 550 may be connected with channels 620 through a robot connector 610. The chatting bots 550 may include, for example, the bots such as refund 551, repurchase 553, and talk 555 which are implemented according to the type of the post-payment service, and bots such as NIKE™ 557 and WALMART™ 559 which are implemented according to the seller. The user may be provided with an unmanned chatting service through various channels 620, and the channels 620 may include, for example, e-mail 621, SMS 622, chatting application 623, and web (chatting control) 624.

The bot connector 610 may, for example, process a connection for sessions tracking with the channels 630. The bot connector 610 may deliver a message, and manage the connection state. Further, the bot connector 610 may register the various chatting bots 550, and determine which chatting bot is connected. The bot connector 610 may be included in the messenger server 106 or the electronic device 101.

Hereinafter, various embodiments of the present invention are described using flowcharts and examples such as UI display. The electronic device described as the operating entity in the following descriptions may include whole or part (e.g., the processor 120) of the electronic device 101 of FIG. 1 or the electronic device 201 of FIG. 2, or whole or part (e.g., the processor 420) of the electronic device 101 of FIG. 4.

Figure 7:
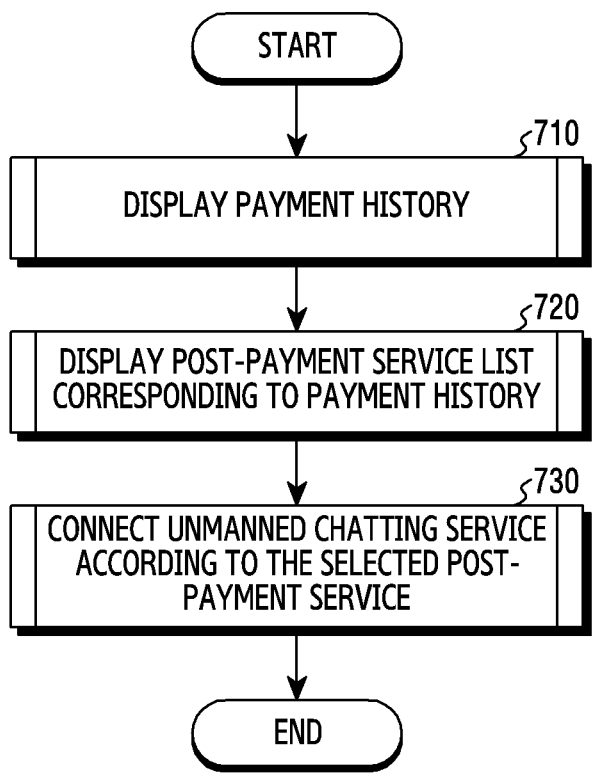
FIG. 7 illustrates a flowchart for providing a post-payment service in an electronic device according to various embodiments of the present invention.

FIG. 7 illustrates a flowchart for providing a post-payment service in an electronic device according to various embodiments of the present invention. FIG. 7 illustrates an operating method of the electronic device 101.

Figure 8:
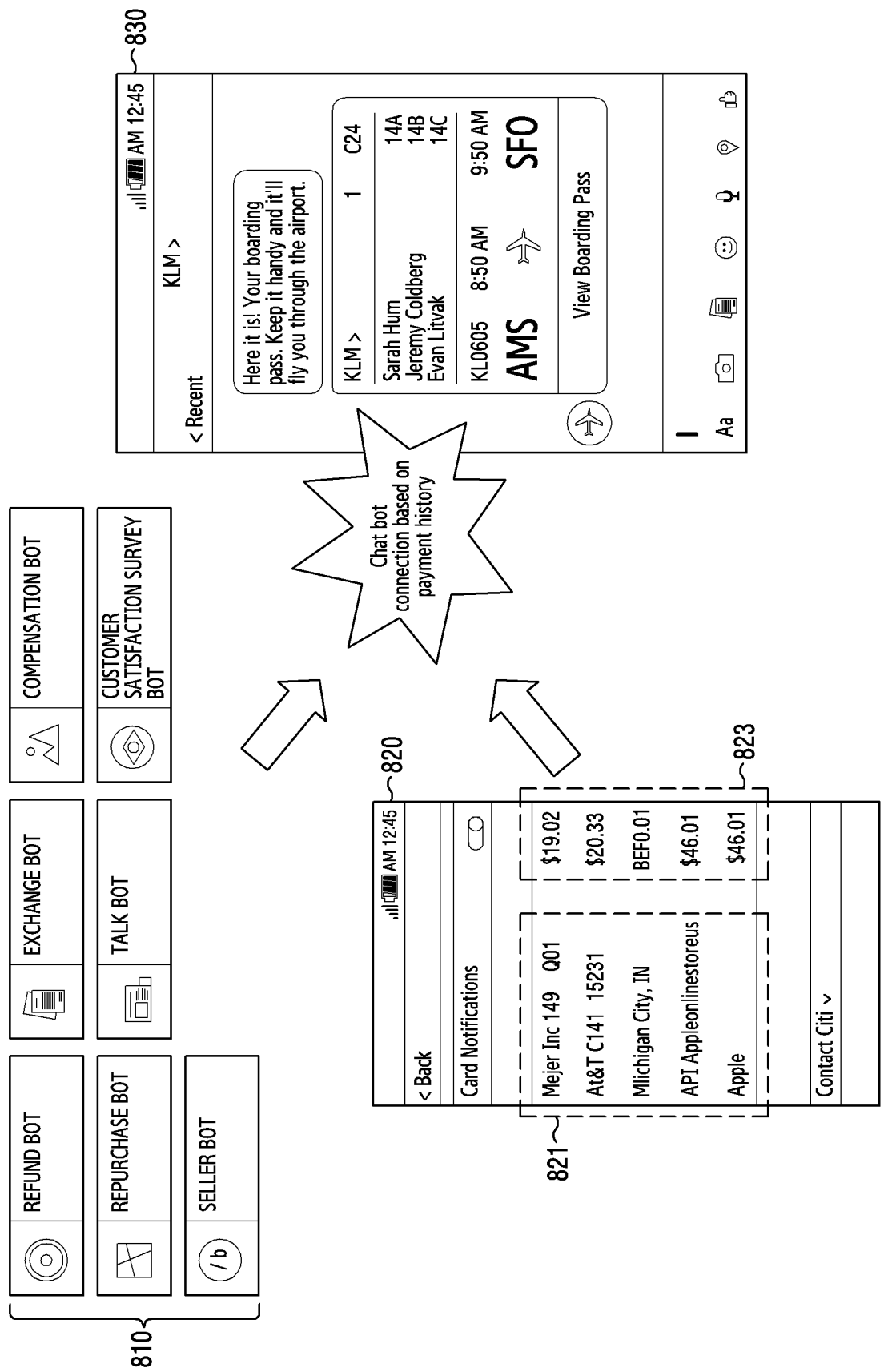
FIG. 8 schematically illustrates a post-payment service through transaction history and connections with various unmanned chatting service bots according to various embodiments of the present invention.

Referring to FIG. 7, in operation 710, the electronic device displays payment history on the display 410. For example, the control unit 420 controls to display the payment history stored in the storage unit 430 on the screen of the electronic device, according to a user's selection. For example, according to executing a messenger application or a payment application, the payment history may be displayed through the messenger or payment application. As another example, the payment history may be displayed by selecting a notification message or an SMS message received at the electronic device 101 because the payment history occurs, without the user's executing the application separately. For example, the payment history may be displayed as shown in FIG. 8. Referring to FIG. 8, payment history 820 may be configured in the form of a list including seller information 821 and prices 823.

Next, in operation 720, the electronic device displays a post-payment service list corresponding to the payment history. That is, the control unit 420 controls to display a predefined post-payment service list depending on the payment history or the seller, according to the payment history selected by the user. For example, the post-payment service list may include at least one of refund, exchange, compensation, repurchase, talk, customer satisfaction survey, order confirmation, and shipping confirmation. For example, although the user does not separately execute the application, the post-payment service list may be displayed by selecting the notification message or the SMS message received at the electronic device if the payment history occurs. For example, The post-payment service list may be determined at a corresponding seller server 109 or payment server 108 based on a corresponding seller name, a seller store, location information of the seller store using GPS, and a type of a purchased product if mobile payment history occurs, and may be displayed at the electronic device. For example, the post-payment service list may be determined by further considering payment communication module (e.g. MST scheme or NFC scheme) information.

Next, in operation 730, the electronic device connects an unmanned chatting service according to the selected post-payment service. That is, the control unit 420 connects an appropriate chatting bot and the unmanned chatting service, according to the post-payment service selected by the user. For example, the control unit 420 may select the chatting robot corresponding to the post-payment service selected by the user or the seller, and transmit a connection request message to a corresponding chatting bot server. For example, the process of connecting the unmanned chatting service corresponding to the payment history may be shown in FIG. 8. Referring to FIG. 8, chatting bots 810 may be divided to, for example, refund, exchange, compensation, repurchase, talk, customer satisfaction survey, order confirmation, and shipping confirmation bots according to the post-payment service type, and may be divided into a specific seller bot depending on the seller. In FIG. 8, if the post-payment service is selected by the user in payment history displayed through the screen such as payment history 820, the control unit 420 may determine and connect a chatting bot corresponding to the selected post-payment service or the seller among the chatting bots 810. As a result, the unmanned chatting service according to the payment history may be connected, and an unmanned chatting service connection screen 830 may be displayed. At this time, before connecting the unmanned chatting service, the control unit 420 may transmit data required to provide the selected post-payment service to a seller server, a messenger server or a chaffing bot server.

According to the embodiment as described by referring to FIG. 7 and FIG. 8, the payment history may be displayed on the electronic device, and the unmanned chatting service corresponding to the post-payment service may be provided. Hence, the post-payment service may be provided to the user through more convenient and intuitive interface. According to one embodiment, payment history details, the post-payment service list display and the unmanned chatting service connection may be implemented as shown in FIG. 9 through FIG. 33.

Figure 9:
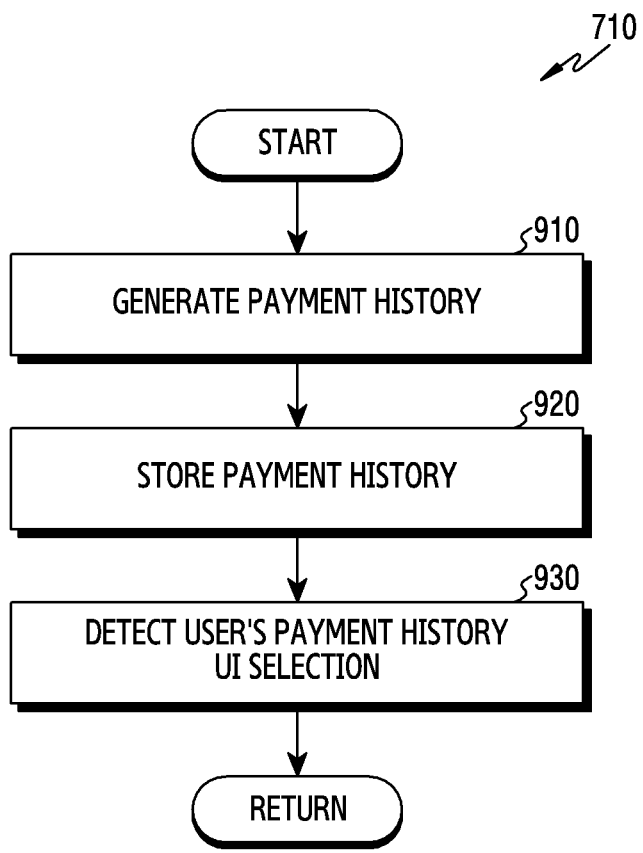
FIG. 9 illustrates a flowchart for displaying payment history in an electronic device according to various embodiments of the present invention.

FIG. 9 illustrates a flowchart for displaying payment history in an electronic device according to various embodiments of the present invention. FIG. 9 illustrates an operating method of the electronic device 101. If the payment history occurs and the payment history is displayed in operation 710 of FIG. 7, the electronic device 101 may perform specific operations as followings.

Referring to FIG. 9, in operation 910, the electronic device detects mobile payment history occurrence. For example, the control unit 420 may control the mobile payment process by transmitting payment information to an external device (e.g., the POS device 102) through a payment application of the electronic device, and determine the occurrence of the mobile payment.

In operation 920, the electronic device stores the mobile payment history. That is, the control unit 420 controls the storage unit 430 to store the payment history generated from the payment application, and accordingly, the storage unit 430 stores the payment history. According to other embodiments, the mobile payment history may be stored in an external server (e.g., the messenger server 106, the payment server 108 or the seller server 109), rather than the storage unit 430 of the electronic device.

The stored payment history may be shared between applications, or between servers. For example, if the messenger application is a payment management application, each payment application in the electronic device may share the processed payment histories with the messenger application. For such sharing, payment history data may be delivered in the form of a predefined format between the payment application and the messenger application. For example, information of the seller which is a payment target may be included in the predefined format. Since the payment history information is sensitive information, consent may be obtained from the user before sharing the information from the payment application to the messenger application. For example, if a user profile of the payment application is the same as a user profile of the messenger profile, or if the user goes through the process such as the consent on the information sharing in the payment application and the messenger application, the payment server 108 and the messenger server 106 may share the payment history information. For example, if the seller joins the messenger service and the user makes friends with the seller, the seller server 109 may directly share the payment history information to the messenger server 106 even though data is related to the payment processed in other path. According to other embodiments, if the payment application is the payment management application, since the payment history information is stored if the payment is made using the corresponding payment application, the payment application may manage the payment history without separate sharing process.

In operation 930, the electronic device detects a user's payment history UI selection. That is, the control unit 420 may detect a touch input of the user, and determine the UI selection for displaying the payment history according to a position of the detected touch input. For example, the UI for displaying the payment history may be the payment application or the messenger application. If detecting such payment application or messenger application UI execution, the electronic device may display the payment history stored in the storage unit 430. According to other embodiments, the electronic device may receive payment history from an external server (e.g., the messenger server 106, the payment server 108 or the seller server 109), and thus display the payment history.

Figure 10:
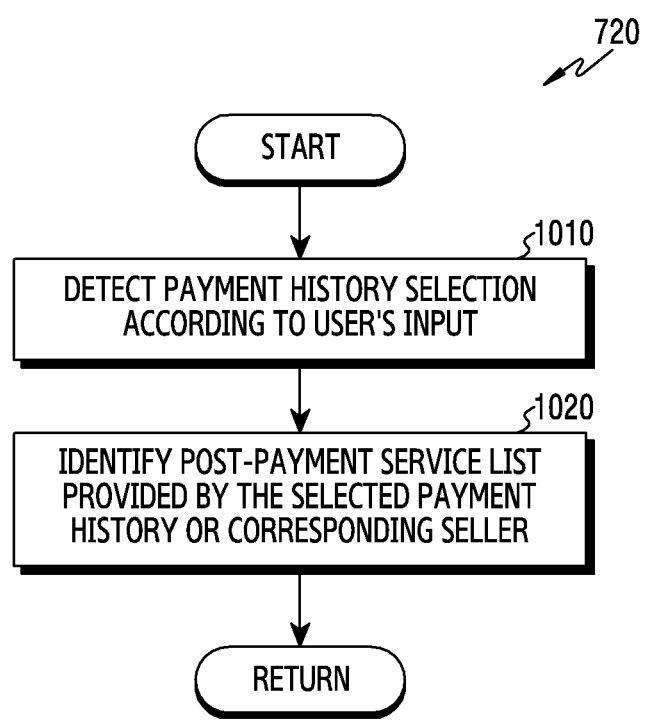
FIG. 10 illustrates a flowchart for displaying a post-payment service list in an electronic device according to various embodiments of the present invention.

FIG. 10 illustrates a flowchart for displaying a post-payment service list in an electronic device according to various embodiments of the present invention. FIG. 10 illustrates an operating method of the electronic device 101. The electronic device 101 may perform specific operations as follows, if displaying the post-payment service list after displaying the payment history in operation 720 of FIG. 7.

Referring to FIG. 10, in operation 1010, the electronic device detects a payment history selection according to a user's input. For example, the control unit 420 may detect the user's input through a payment application or a messenger application of the electronic device, and determine that particular payment history is selected.

In operation 1020, the electronic device identifies the post-payment service list corresponding to the selected payment history or provided by a corresponding seller. For example, the control unit 420 may identify the post-payment service list corresponding to the payment history selected by the user input through a mapping table. According to other embodiments, the control unit 420 may identify a seller of the payment history selected by the user's input, and identify the predefined post-payment service list provided by the corresponding seller. The control unit 420 may control to display the identified post-payment service through the display 410.

For example, identifying the post-payment service list may be carried out through the mapping table defined according to the selected payment history or the seller information. For example, the post-payment service list may be received from the seller server 109 or other external device (e.g., the messenger server 106 or the payment server 108, etc.). According to other embodiments, a plurality of the seller servers 109 may be connected to the payment server 108 and provide a separate post-payment service list for each seller. At this time, the payment server 108 may store and manage the post-payment service list provided per seller. Examples of the post-payment service list may include refund, exchange, compensation, repurchase, talk, customer satisfaction survey, order confirmation, shipping confirmation, and so on. Each seller may predefine a necessary message template for each service, and share it. If the seller shares the message template including necessary information (e.g., payment date, payment number, payment amount, etc.) for each post-payment service, if the user selects a corresponding post-payment service, a message may be generated in a corresponding format and transmitted to the seller server 109 or a corresponding chatting bot server. For example, the payment server 108 may transmit post-payment service information per seller to the payment application, and the payment application may manage this information. The time for transmitting the corresponding information from the payment server 108 may be the time when the payment history information is generated.

If there is no post-payment service information stored in the electronic device, corresponding information may be requested from the seller server 109 or other external device (e.g., the messenger server 106 or the payment server 108). Since there may be a seller not supporting the post-payment service, the electronic device may identify whether the seller supports the post-payment service, and stop displaying the post-payment list if the corresponding seller does not support the post-payment service.

Figure 11:
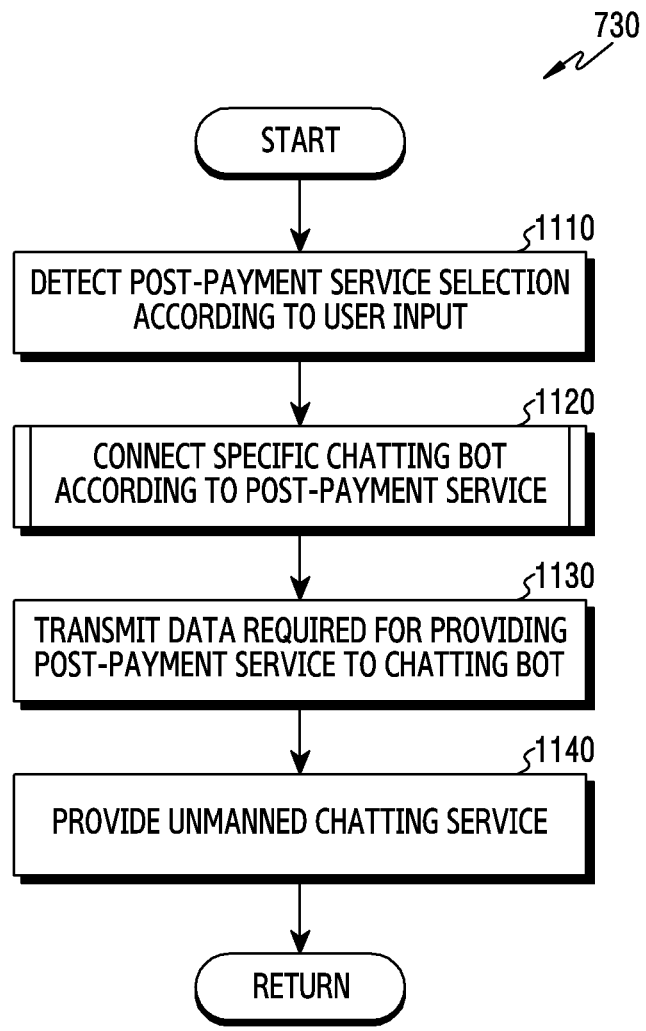
FIG. 11 illustrates a flowchart for connecting an unmanned chatting service in an electronic device according to various embodiments of the present invention.

FIG. 11 illustrates a flowchart for connecting an unmanned chatting service in an electronic device according to various embodiments of the present invention. FIG. 11 illustrates an operating method of the electronic device 101. The electronic device 101 may perform specific operations as follows, if starting the unmanned chatting service after displaying the post-payment service list in operation 730 of FIG. 7.

Referring to FIG. 11, in operation 1110, the electronic device detects a post-payment service selection according to a user input. For example, the control unit 420 may detect the user's input through a payment application or a messenger application of the electronic device, and determine that particular post-payment service is selected.

In operation 1120, the electronic device may connect a specific chatting bot according to the post-payment service. For example, the control unit 420 may determine the chatting bot to connect based on at least one of the post-payment service selected by the user input, a sale store, and a product for sale, and control the communication unit 440 to request the unmanned chatting service connection from the selected chatting bot server. According to other embodiments, the electronic device may request the unmanned chatting service connection from the messenger server 106, and the messenger server 106 may select a chatting robot based on at least one of the post-payment service and the seller. In this case, the messenger server 106 may transmit an unmanned chatting service connection message to the corresponding chatting bot, and provide the unmanned chatting service to the electronic device. According to other embodiments, selecting the chatting bot based on at least one of the post-payment service and the seller may be fulfilled by the seller server 109.

In operation 1130, the electronic device transmits data necessary for the post-payment service to the selected chatting bot. For example, the control unit 420 may transmit the necessary data (e.g., payment date, payment number, payment amount, etc.) for a post-payment service type to the selected chatting bot. For example, according to a format predefined by the seller, the control unit 420 may generate a message corresponding to the corresponding post-payment service, and control to transmit the generated message to the selected chatting bot. According to other embodiments, operation 1130 of transmitting the necessary data may be omitted, and operation 1140 may be executed immediately.

In operation 1140, the electronic device provides the unmanned chatting service with the connected chatting bot. For example, the communication unit 440 may receive a message for starting the unmanned chatting service from the connected chatting bot server, and the control unit 420 may control to display an unmanned chatting service execution screen through the messenger application, the payment application, or a separate chatting application. For example, the communication unit 440 may receive a push message for the unmanned chatting service from the chatting bot server, and the control unit 420 may control to display a start screen of a corresponding unmanned chatting service through a user's input which allows starting the unmanned chatting service.

Figure 12:
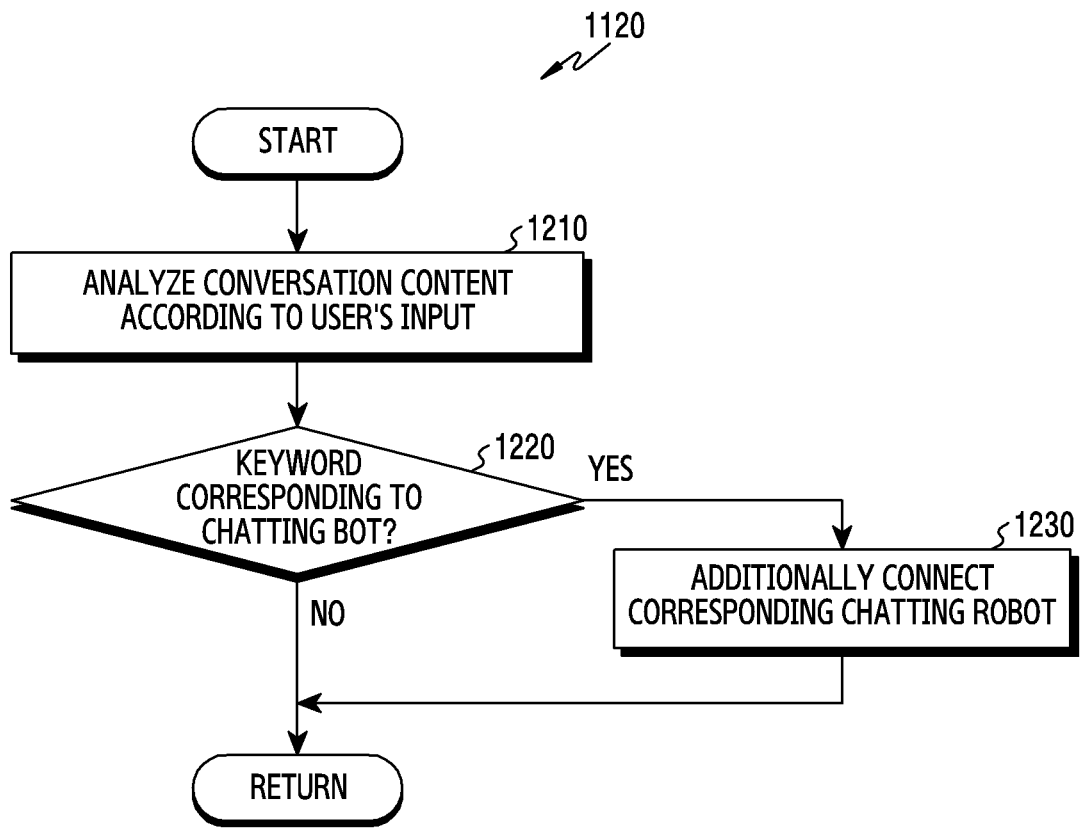
FIG. 12 illustrates a flowchart for connecting an additional unmanned chatting service during an unmanned chatting service in an electronic device according to various embodiments of the present invention.

FIG. 12 illustrates a flowchart for connecting an additional unmanned chatting service during an unmanned chatting service in an electronic device according to various embodiments of the present invention. FIG. 12 illustrates an operating method of the electronic device 101. The electronic device 101 may perform specific operations as follows, if connecting an additional chatting bot while connecting to the chatting bot and exchanging messages in operation 1120 of FIG. 11.

Referring to FIG. 12, in operation 1210, the electronic device analyzes conversation content according to a user's input. For example, the control unit 420 may analyze an input message to be transmitted to the chatting robot connected by the user. For example, analyzing the message may be a process of detecting a particular keyword in the user's input content.

In operation 1220, the electronic device determines whether there is a keyword corresponding to the chatting bot according to conversion content analysis results. For example, the control unit 420 may detect the keyword corresponding to a particular chatting bot in the user's input content. If the control unit 420 determines that there is the keyword corresponding to the chatting bot, the electronic device performs operation 1230.

In operation 1230, the electronic device connects the chatting robot corresponding to the keyword according to the conversation content. For example, the control unit 420 may determine the chatting bot to connect with the keyword detected in the user input, and the communication unit 440 may request the unmanned chatting service connection from the selected chatting bot server. According to other embodiments, the electronic device may display a dialog window which inquires about whether to perform additional connection with the chatting bot on the screen of the electronic device before performing the additional connection with the chatting bot. In this case, the electronic device may additionally connect the chatting bot only if detecting a user's input that approves the additional chatting bot connection. According to other embodiments, determining the additional chatting bot by analyzing the conversation content according to the user's input may be performed by the messenger server 106.

Figure 13:
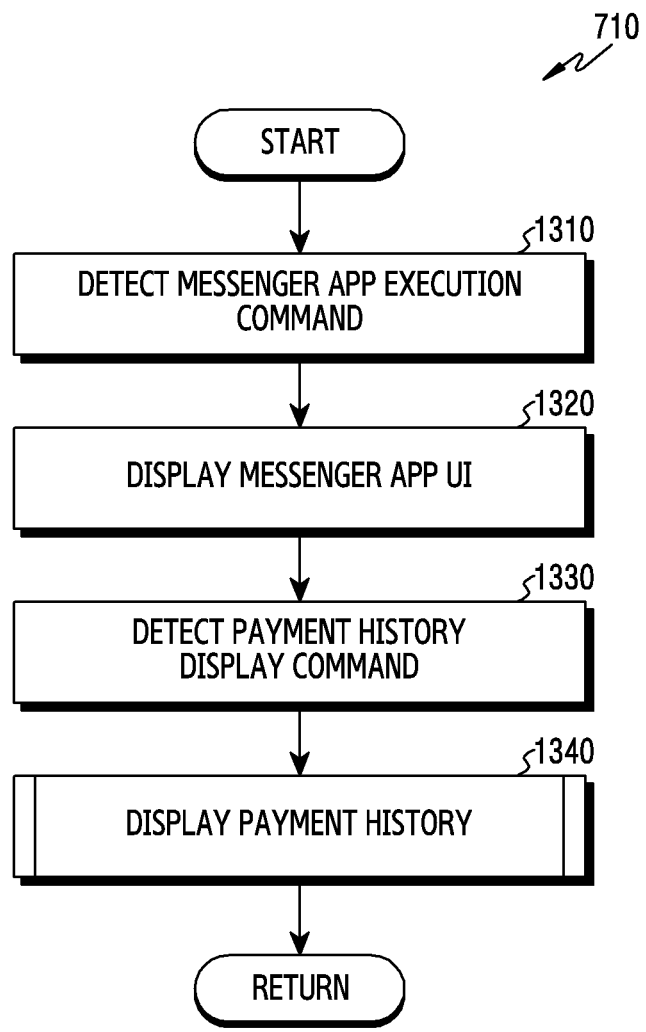
FIG. 13 illustrates a flowchart for displaying payment history on a messenger application in an electronic device according to various embodiments of the present invention.

FIG. 13 illustrates a flowchart for displaying payment history on a messenger application in an electronic device according to various embodiments of the present invention. FIG. 13 illustrates an operating method of the electronic device 101. If displaying the payment history through the messenger application in operation 710 of FIG. 7, the electronic device 101 may perform specific operations as the following descriptions.

Referring to FIG. 13, in operation 1310, the electronic device detects an execution command of the messenger application. For example, the control unit 420 controls to execute the messenger application by detecting a touch input of a messenger application icon by the user.

Figure 14:
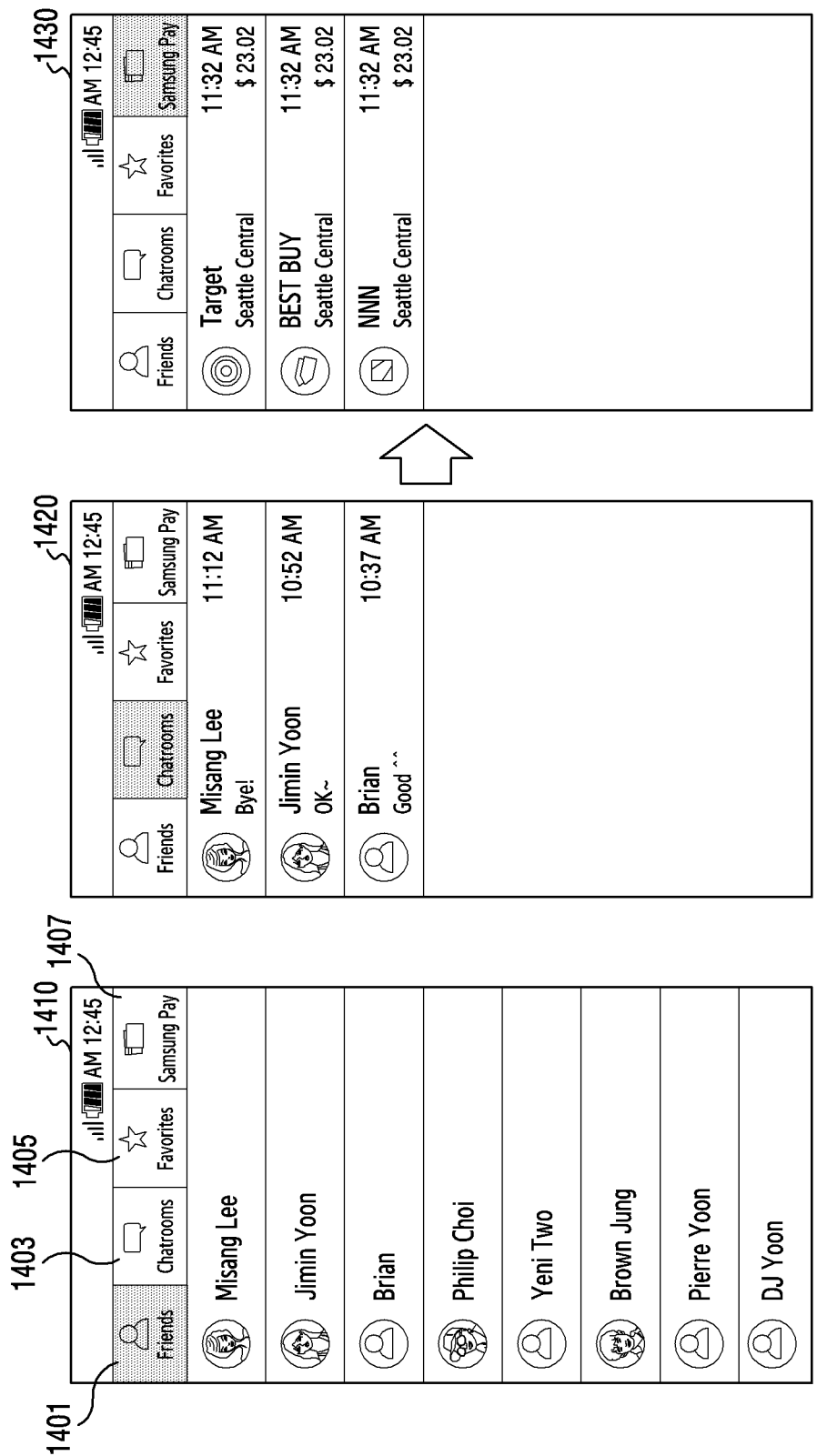
FIG. 14 illustrates an example of displaying history payment on a messenger application in an electronic device according to various embodiments of the present invention.

In operation 1320, the electronic device may display an UI of the executed messenger application. That is, the control unit 420 controls to display the execution UI screen of the corresponding messenger application. For example, the execution screen of the messenger application may be displayed as shown in FIG. 14. In FIG. 14, the messenger application UI screen may be displayed through a screen such as a first screen 1410 or a second screen 1420. For example, the messenger application UI screen may distinguish and display tabs. For example, in the screen such as the first screen 1410, the messenger application UI screen may include a friends tab 1401, a chatroom tab 1403, a favorites tab 1405, or a payment history tab 1407 of a payment method (e.g., SamsungPay). As shown in the first screen 1410, a selected tab may be highlighted or may be displayed with a different character shape, thickness or size.

For example, in the first screen 1410, the messenger application UI may display the friends tab 1401 by highlighting it, and display a friends list below the tab region 1401 through 1407. For example, in the screen such as the second screen 1420, the messenger application UI may display the chatroom tab 1403 by highlighting it, and display a chatroom list below the tab region 1401 through 1407.

In operation 1330, the electronic device detects a payment history tab display command. That is, the control unit 420 detects the command for requesting to display the payment history on the UI screen according to a user's input. For example, the control unit 420 may detect a touch input which selects the payment history tab 1407 of the payment method in the messenger application UI screen of FIG. 14.

In operation 1340, the electronic device displays payment history. For example, the payment history may be displayed in the UI screen of the messenger application as shown in FIG. 14. In FIG. 14, the messenger application UI screen may be displayed through a screen such as a third screen 1430. For example, in the third screen 1430, the messenger application UI screen may highlight and display the payment history tab 1407 of the payment method (e.g., SamsungPay), and display a payment history list below the tab region 1401 through 1407. In other embodiments, the payment history may be displayed in other tab region such as friends tab 1401 or chatroom tab 1403, than the payment history tab 1407.

Figure 15:
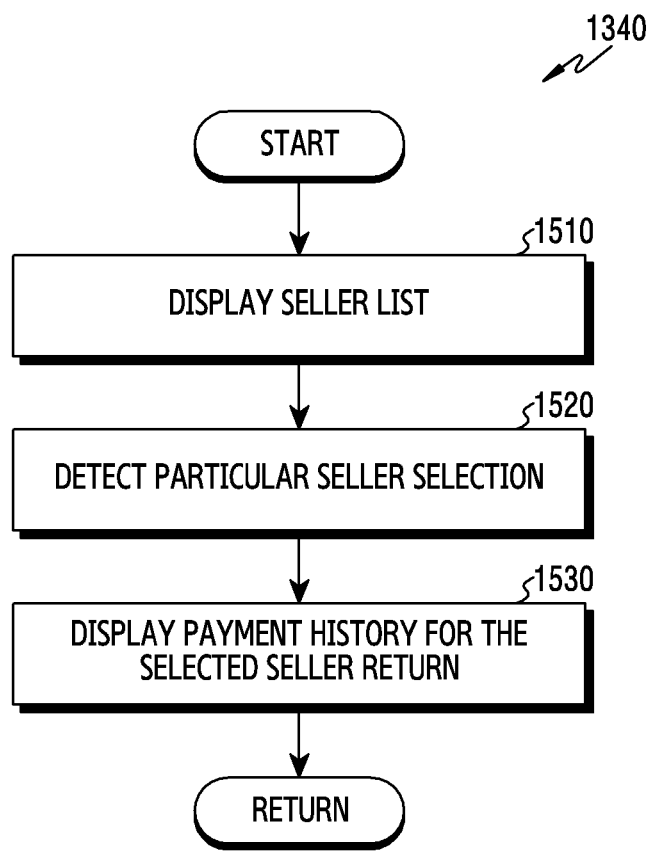
FIG. 15 illustrates a flowchart for displaying seller-specific payment history in an electronic device according to various embodiments of the present invention.

FIG. 15 illustrates a flowchart for displaying seller-specific payment history in an electronic device according to various embodiments of the present invention. FIG. 15 illustrates an operating method of the electronic device 101. If displaying the payment history per seller through the messenger application in operation 1340 of FIG. 13, the electronic device 101 may perform specific operations as the following descriptions.

Figure 16:
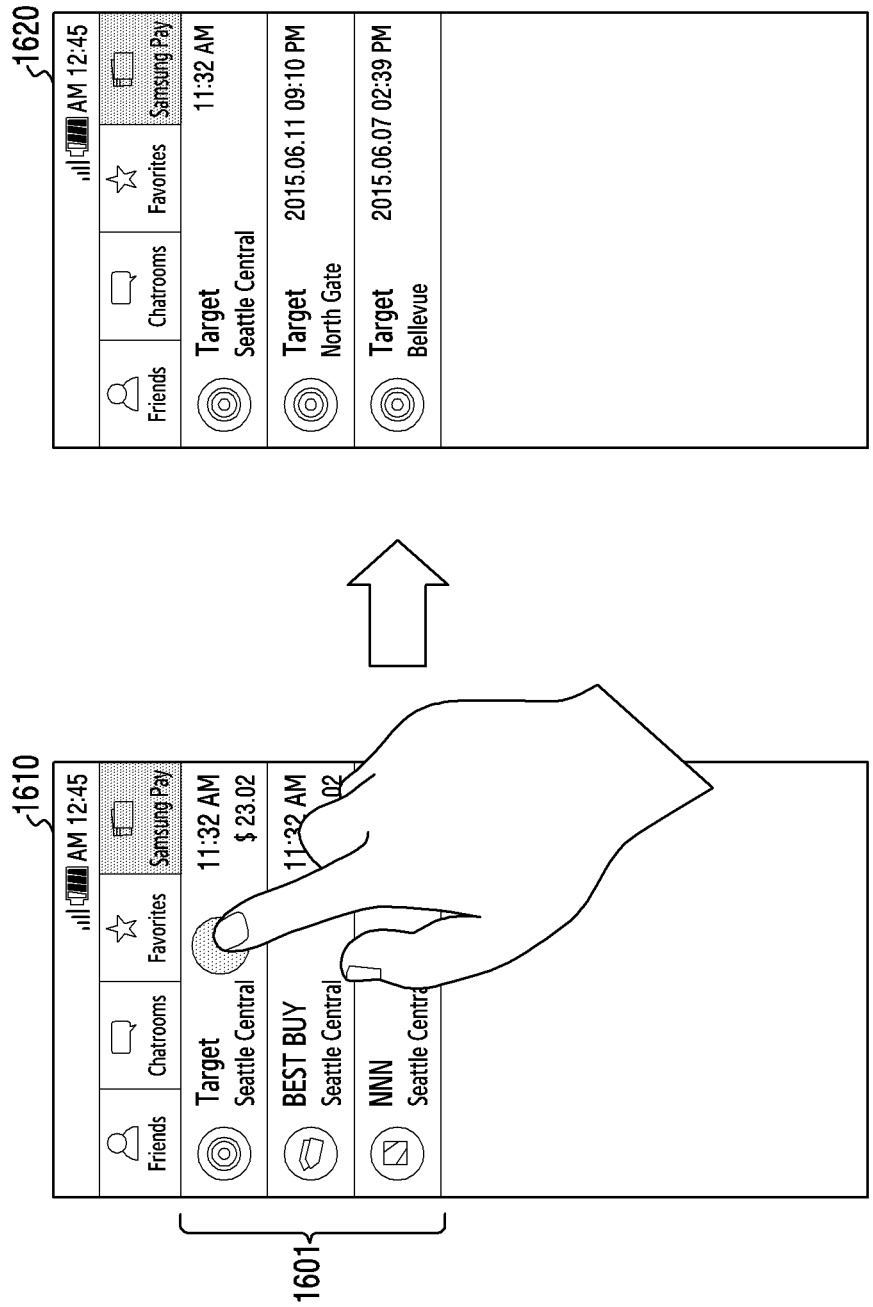
FIG. 16 illustrates an example of displaying seller-specific payment history on a messenger application in an electronic device according to various embodiments of the present invention.

Referring to FIG. 15, in operation 1510, the electronic device displays a seller list. That is, the control unit 420 controls to display the list sorted per seller, instead of listing the entire payment history. For example, the seller list in the UI screen of the messenger application may be displayed as shown in FIG. 16. In FIG. 16, the seller list may be displayed through a screen such as a first display 1610. For example, in the first screen 1610, a list display region 1601 may be displayed below the tab region, and the seller list may be displayed in the list display region 1601.

In operation 1520, the electronic device detects selection for a particular seller. That is, the control unit 420 detects a user's touch input, and determines a particular seller selection according to a user input position. For example, the UI screen of the messenger application may display the selection of the particular seller as shown in FIG. 16. In FIG. 16, the operation for selecting the particular seller may be displayed on a screen such as the first screen 1610. For example, in the first screen 1610, the seller list may be displayed in the list display region 1601, and the user may select the particular seller through a touch input.

In operation 1530, the electronic device displays payment history for the selected seller. That is, the control unit 420 controls to display the seller selected through the user's touch input and the history of the payment. For example, the UI screen of the messenger application may display the payment history for the selected seller as shown in FIG. 16. In FIG. 16, the history of the payment with the selected seller may be displayed on the screen such as a second screen 1620. For example, in the second screen 1620, a payment history list of the selected seller may be displayed in the list display region 1601.

Figure 17:
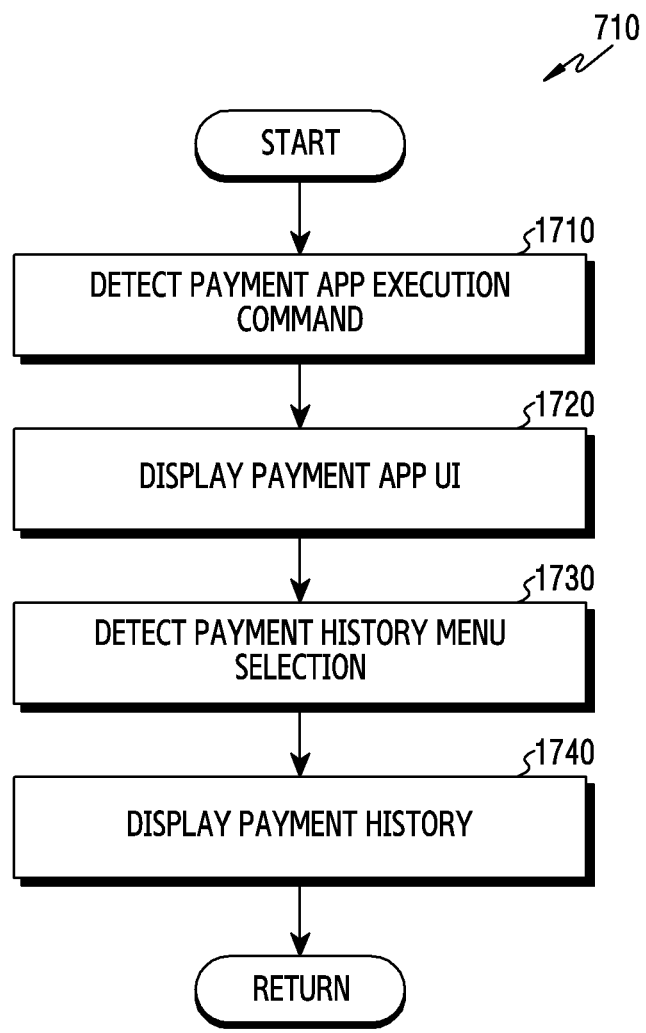
FIG. 17 illustrates a flowchart for displaying payment history on a payment application in an electronic device according to various embodiments of the present invention.

FIG. 17 illustrates a flowchart for displaying payment history on a payment application in an electronic device according to various embodiments of the present invention. FIG. 17 illustrates an operating method of the electronic device 101. If displaying the payment history through the payment application in operation 710 of FIG. 7, the electronic device 101 may perform specific operations as the following descriptions.

Referring to FIG. 17, in operation 1710, the electronic device detects an execution command of the payment application. For example, the control unit 420 controls to execute the payment application by detecting a user's touch input of a payment application icon.

In operation 1720, the electronic device displays a UI of the executed payment application. That is, the control unit 420 controls to display the UI screen of the payment application executed by the user's touch input.

In operation 1730, the electronic device detects a payment history menu selection. That is, the control unit 420 may detect a user's touch input, and determine the menu selection for displaying the payment history according to a position of the detected touch input.

Figure 18:
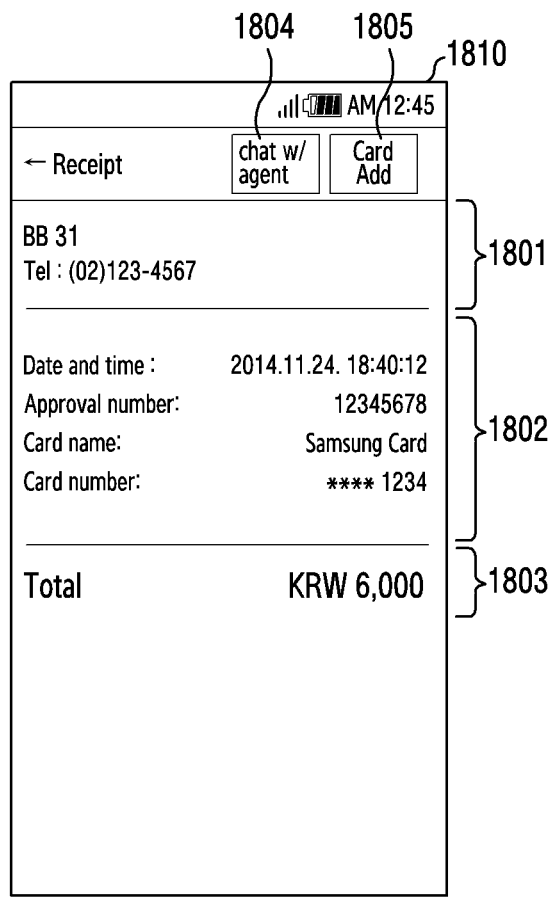
FIG. 18 illustrates an example of displaying payment history on a payment application in an electronic device according to various embodiments of the present invention.

In operation 1740, the electronic device displays payment history. That is, the control unit 420 controls to display the payment history according to the payment history menu selected through the user's touch input. According to another embodiment, operation 1730 may be omitted, and the UI screen of the payment application is displayed and concurrently the payment history may be immediately displayed as a basic screen according to operation 1740. For example, though the user does not separately execute the application, the payment history may be displayed by selecting a notification message or an SMS message received at the electronic device if the payment history occurs. For example, the UI screen of the payment application may display the payment history as shown in FIG. 18. In FIG. 18, the payment application UI screen may be displayed through a screen such as a screen 1810. For example, in the screen 1810, the payment application UI may display seller information 1801, payment information 1802 (e.g., payment date and time, approval number, card type, card number, etc.), payment amount information 1803, post-payment service menu 1804, and card add menu 1805. For example, if the user selects the post-payment service menu 1804, a post-payment service list may be displayed. In other embodiments, the payment application UI screen may be configured by removing some configuration or further including additional information.

Figure 19:
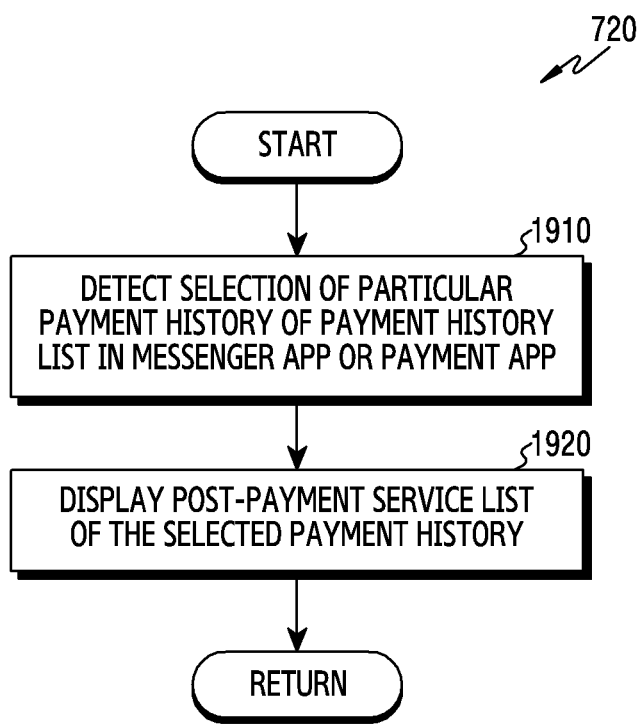
FIG. 19 illustrates a flowchart for displaying a post-payment service list on a messenger or payment application in an electronic device according to various embodiments of the present invention.

FIG. 19 illustrates a flowchart for displaying a post-payment service list on a messenger or payment application in an electronic device according to various embodiments of the present invention. FIG. 19 illustrates an operating method of the electronic device 101. If displaying the post-payment service list through the messenger or payment application in operation 720 of FIG. 7, the electronic device 101 may perform specific operations as the following descriptions.

Figure 20A:
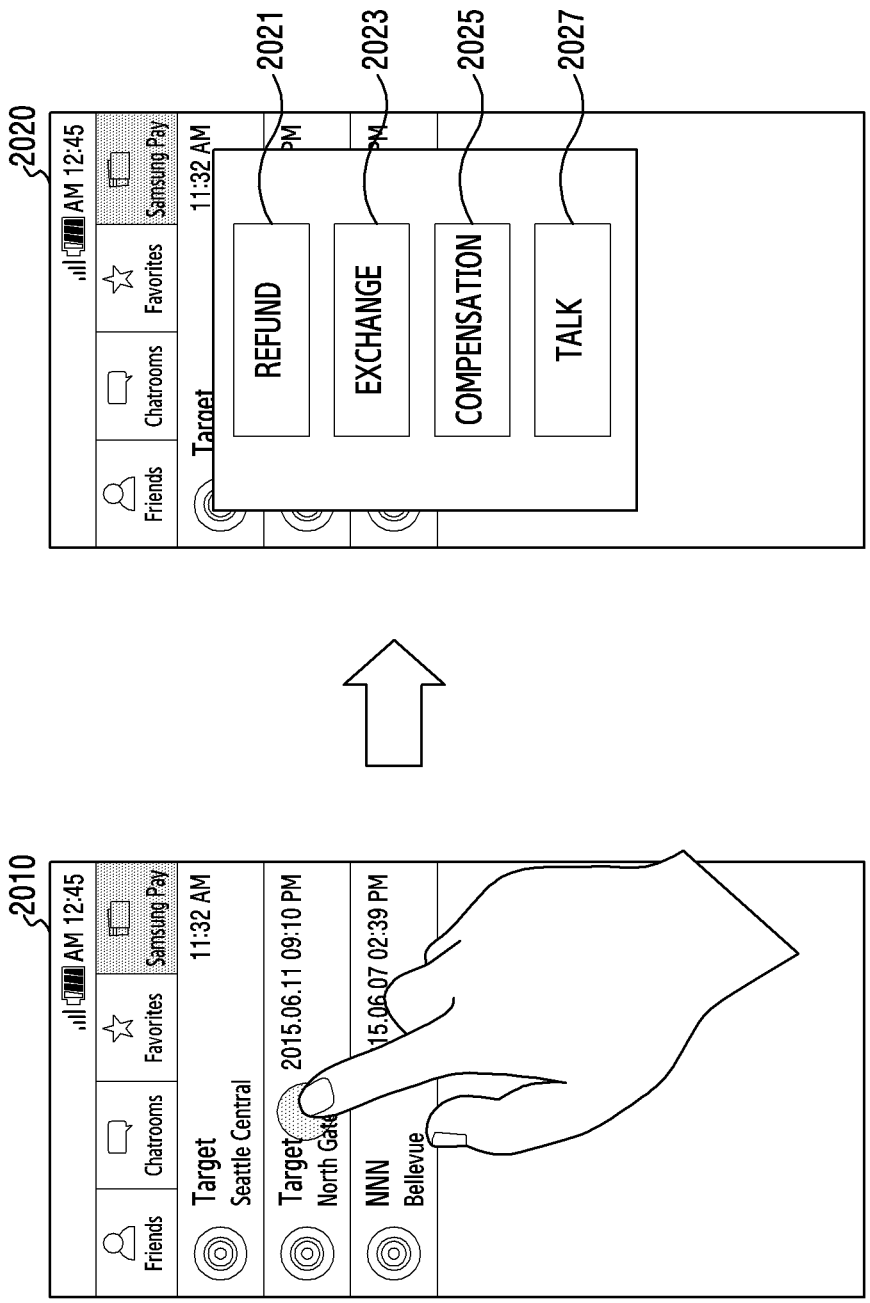
FIG. 20A and FIG. 20B illustrate examples of displaying a post-payment service list on a messenger or payment application in an electronic device according to various embodiments of the present invention.
Figure 20B:
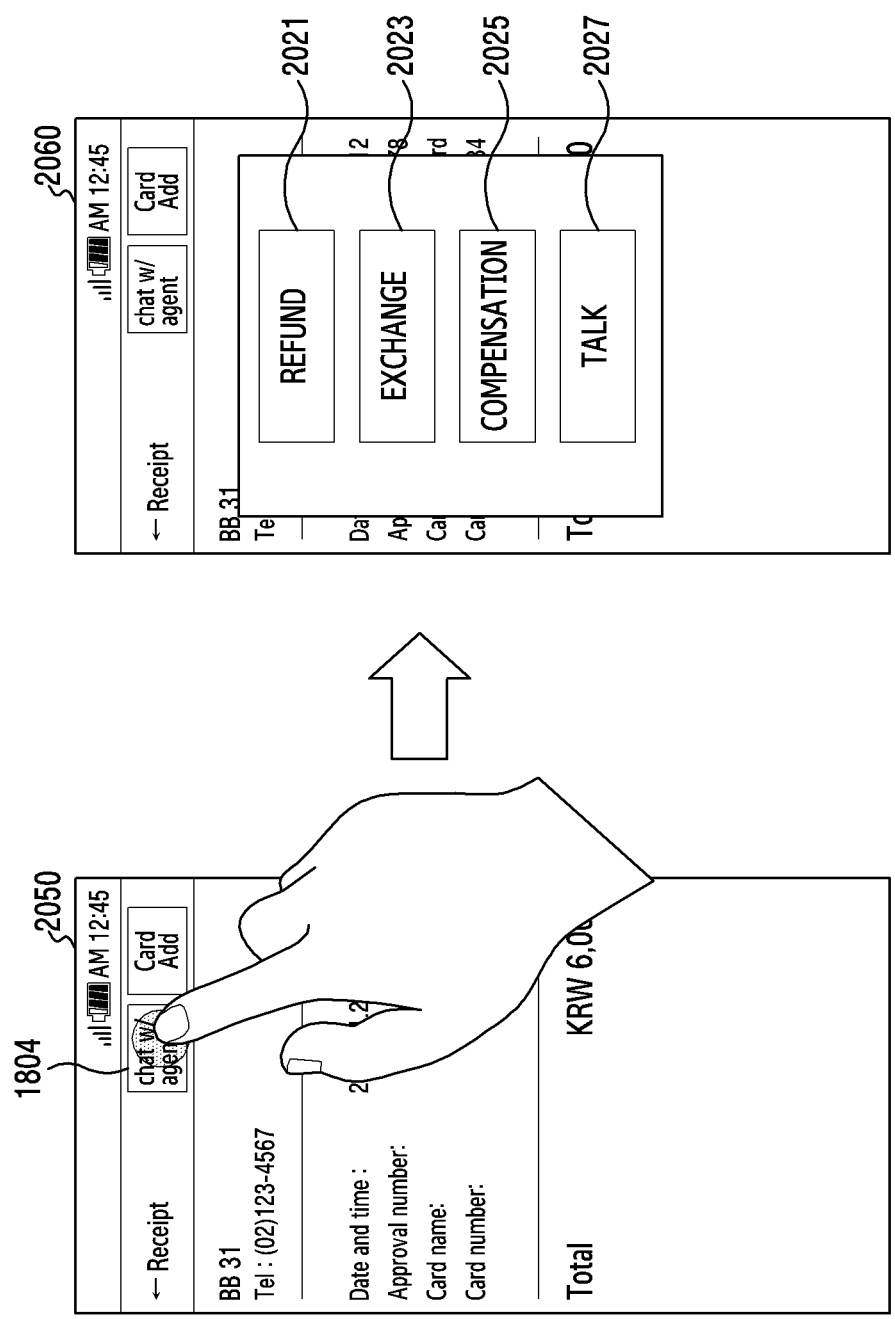

Referring to FIG. 19, in operation 1910, the electronic device detects selection of a particular payment history of a payment history list in the messenger application or the payment application. That is, the control unit 420 detects a user's touch input in a messenger or payment application UI screen, and determines the particular payment history selection of the payment history list according to a position of the detected touch input. For example, the selection detection of the payment history in the UI screen of the messenger application may be depicted as shown in FIG. 20A. In FIG. 20A, the payment history list may be displayed through a screen such as a first display 2010. For example, in the first screen 2010, the user may select a particular payment history of the payment history list with a touch input. For another example, the payment history selected in the UI screen of the payment application may be displayed as shown in FIG. 20B. In FIG. 20B, detailed information of the selected particular payment history may be displayed on a screen as a third screen 2050. For example, though the user does not separately execute the application, the payment history may be displayed by selecting a notification (notification) message or an SMS message received at the electronic device if the payment history occurs.

In operation 1920, the electronic device may display a post-payment service list of the selected payment history. That is, the control unit 420 controls to display the post-payment service list of the payment history selected through the user's touch input. For example, the post-payment service list of the payment history selected in the UI screen of the messenger application may be displayed as shown in FIG. 20A. In FIG. 20A, the post-payment service list of the selected payment history may be displayed on a screen such as a second screen 2020. For example, the second screen 2020 may display the post-payment service list including refund 2021, exchange 2023, compensation 2025, and talk 2027. For another example, the post-payment service list of the payment history selected on the UI screen of the payment application may be displayed as shown in FIG. 20B. In FIG. 20B, the post-payment service menu selection in detailed information display screen of the payment history may be displayed through the screen such as a third screen 2050. For example, in the third screen 2050, the user may select a post-payment service menu 1704 for a particular payment history with a touch input. Also, in FIG. 20B, the post-payment service list of the selected payment history may be displayed on the screen such as a fourth display 2060. For example, in the fourth screen 2060, the post-payment service list including refund 2021, exchange 2023, compensation 2025 and talk 2027 may be displayed. According to other embodiments, if the selection of the payment history is detected in the payment application as well, the post-payment service list of the selected payment history may be displayed immediately without any user input. According to other embodiments, the post-payment service list may be determined based on at least one of the payment history or the seller. In addition, the post-payment service list may be configured only with a service pre-designated by the seller.

Figure 21:
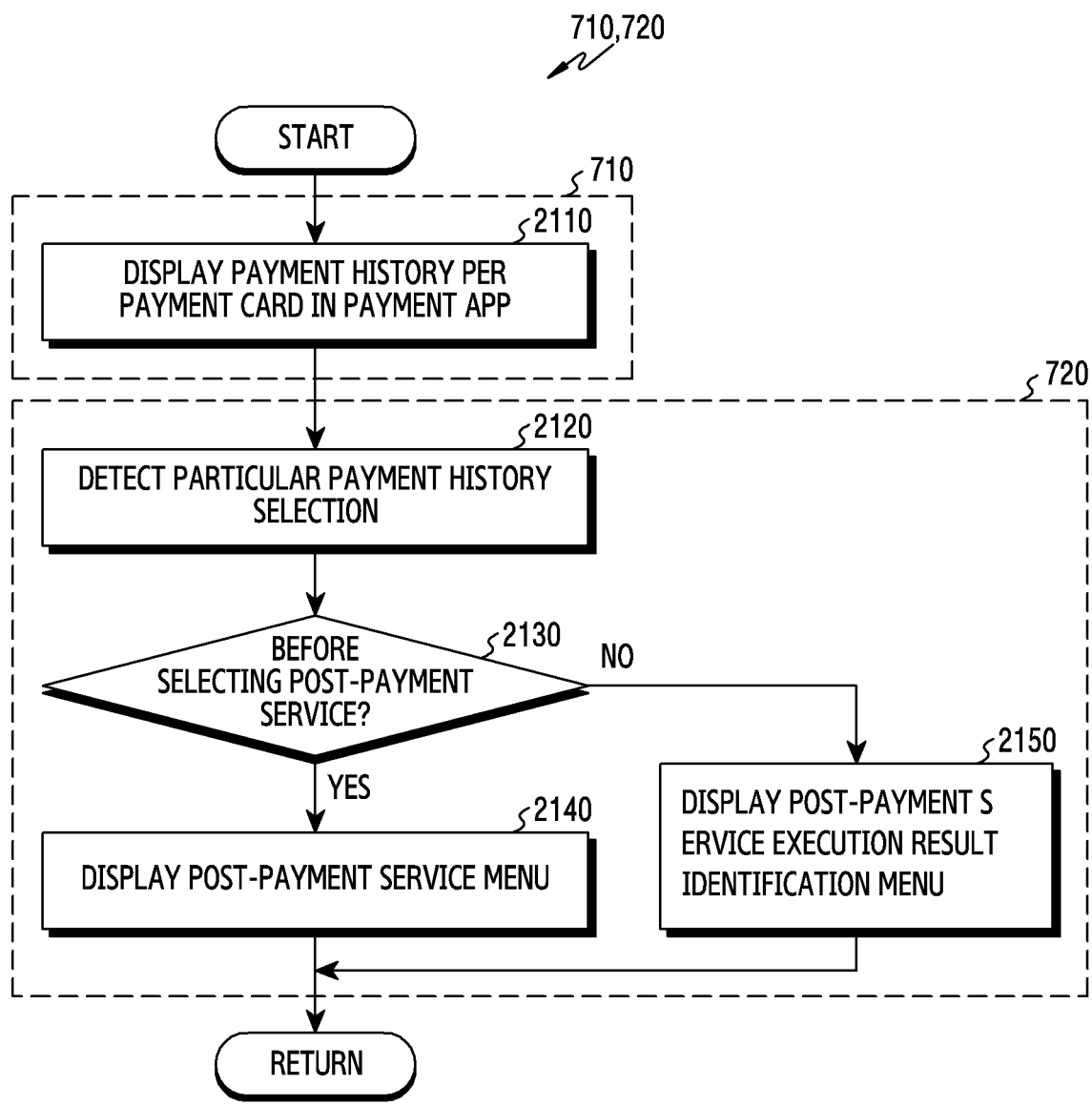
FIG. 21 illustrates a flowchart for displaying a post-payment service menu according to whether a post-payment service is selected on a payment application in an electronic device according to various embodiments of the present invention.

FIG. 21 illustrates a flowchart for displaying a post-payment service menu according to whether a post-payment service is selected on a payment application in an electronic device according to various embodiments of the present invention. FIG. 21 illustrates an operating method of the electronic device 101. If displaying the post-payment service list through the payment application in operations 710 and 720 of FIG. 7, the electronic device 101 may perform specific operations as the following descriptions.

Figure 22:
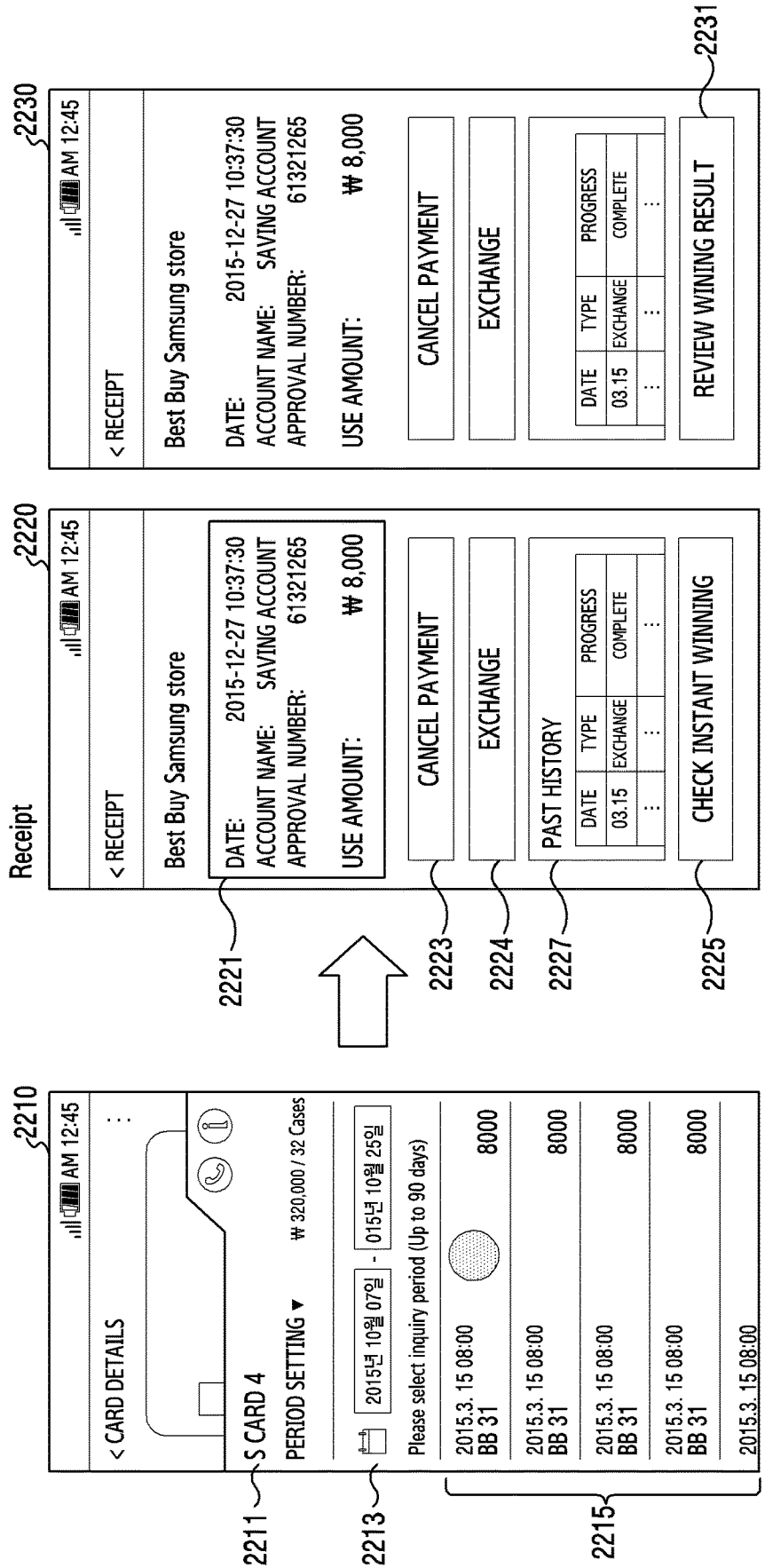
FIG. 22 illustrates an example of displaying payment history according to whether a post-payment service is selected on a payment application in an electronic device according to various embodiments of the present invention.

Referring to FIG. 21, in operation 2110, the electronic device displays payment history in the payment application. That is, the control unit 420 controls to display the payment history per payment card in a payment application UI screen. For example, the payment history in the UI screen of the payment application may be displayed as shown in FIG. 22. In FIG. 22, the payment history per payment card may be displayed on a screen such as a first display 2210. For example, in the first screen 2210, the payment history per payment card may be displayed by including payment card information 2211, inquiry period 2213 and payment history list 2215.

In operation 2120, the electronic device detects selection of a particular payment history of the payment history list in the payment application. That is, the control unit 420 may detect a user's touch input in the payment application UI screen, and determines the particular payment history selection of the payment history list according to a position of the detected touch input. For example, the selection detection of the payment history in the UI screen of the payment application may be shown as in FIG. 22. In FIG. 22, the payment history list may be displayed on the screen such as a first display 2210. For example, in the first screen 2210, the user may select particular payment history of the payment history list 2215 with a touch input.

In operation 2130, the electronic device determines whether the payment history selection precedes the post-payment service selection. That is, the control unit 420 determines whether the selection of the payment history through the user's touch input precedes the execution of the post-payment service, and controls to display a post-payment service display screen differently according to the determination result. For example, the electronic device performs operation 2140, if determining that the corresponding payment history is selected before the particular post-payment service selection. For example, the electronic device performs operation 2150, if determining that the corresponding payment history is selected after the particular post-payment service selection. For example, if the payment history is displayed in the payment application as shown in FIG. 22, the control unit 420 may determine whether the selection of the payment history through the user's touch input is before instant win menu selection.

In operation 2140, the electronic device displays a post-payment service menu corresponding to the selected payment history. That is, before executing the post-payment service for the selected payment history, the control unit 420 controls to display the corresponding post-payment service menu. For example, the post-payment service of the payment history selected on the UI screen of the payment application may be displayed as shown in FIG. 22. In FIG. 22, before selecting the post-payment service, the post-payment service menu of the selected payment history may be displayed on the screen such as a second screen 2220. For example, in the second screen 2220, payment history information including payment information 2221 (e.g., payment date, payment account, payment number, payment amount, etc.) and the post-payment service list including payment cancel 2223, exchange 2224, past history 2227 and check instant winning 2225 may be displayed. The check instant wining 2225 menu may be displayed only if the corresponding payment history is selected if the instant winning menu is not selected before.

According to other embodiments, if any one of the payment cancel 2224, the exchange 2224, and the check instant wining 2225 menu is selected by the user input, an unmanned chatting service screen may be displayed by connecting to a chatting bot corresponding to each post-payment service. For example, if the past history 2227 menu is selected, a past unmanned chatting service screen may be displayed, and the unmanned chatting service may be continued based on past conversations by connecting to a corresponding chatting bot. According to other embodiments, if selecting the past history 2227 menu and connecting to a previous chatting bot, a new chatting bot may be additionally connected with respect to the corresponding payment history by detecting a keyword of the conversation content.

In operation 2150, the electronic device displays a post-payment service execution result identification menu corresponding to the selected payment history. That is, after executing the post-payment service for the selected payment history, the control unit 420 controls to display the execution result identification menu of the corresponding post-payment service. For example, the post-payment service of the selected payment history on the UI screen of the payment application may be displayed as shown in FIG. 22. In FIG. 22, after selecting the post-payment service, a post-payment service menu of the selected payment history may be displayed on the screen such as a third screen 2230. For example, in the third screen 2230, the payment history information including the payment information (e.g., payment date, payment account, payment number, payment amount, etc.) and the post-payment service list including payment cancel and the review winning result 2231 may be displayed. The review winning result 2231 menu may be displayed if corresponding payment history is selected after the instant winning menu is selected. For example, if the review winning result 2231 menu is selected by the user, the unmanned chatting service may be provided by connecting to a chatting bot regarding a corresponding event.

According to other embodiments, the screen including the payment history and the post-payment service may be displayed by selecting a notification message or an SMS message received at the electronic device if the payment history occurs, although the user does not separately execute an application.

According to the embodiments described with reference to FIG. 13 through FIG. 22, the payment history and the post-payment service list may be displayed according to the selected payment history. Hereinafter, by referring to FIG. 23 through FIG. 34, an embodiment of selecting the post-payment service and connecting the corresponding unmanned chatting service will be described.

Figure 23:
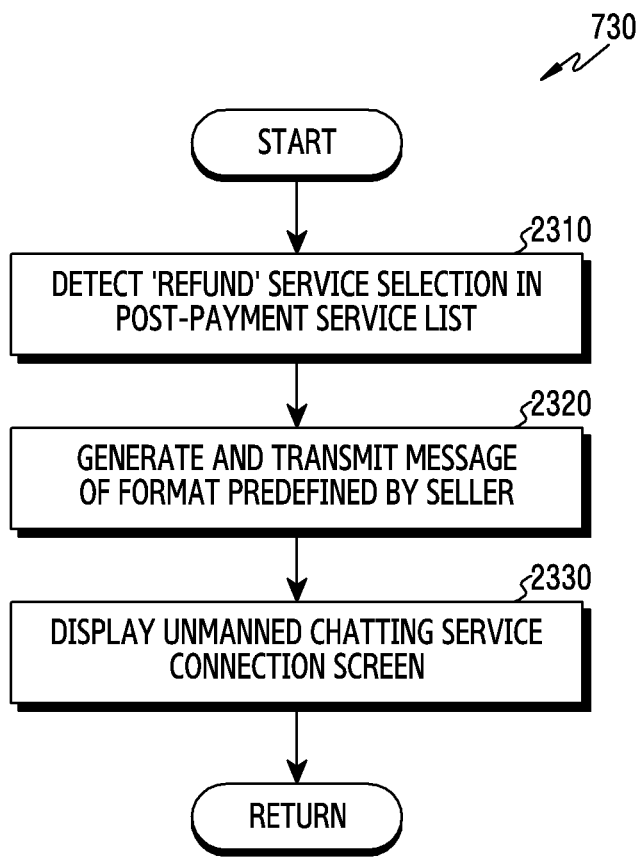
FIG. 23 illustrates a flowchart for connecting an unmanned chatting service according to 'refund' service selection on a messenger application in an electronic device according to various embodiments of the present invention.

FIG. 23 illustrates a flowchart for connecting an unmanned chatting service according to 'refund' service selection on a messenger application in an electronic device according to various embodiments of the present invention. FIG. 23 illustrates an operating method of the electronic device 101. If connecting the unmanned chatting service through the messenger application in operation 730 of FIG. 7, the electronic device 101 may perform specific operations as the following descriptions.

Figure 24:
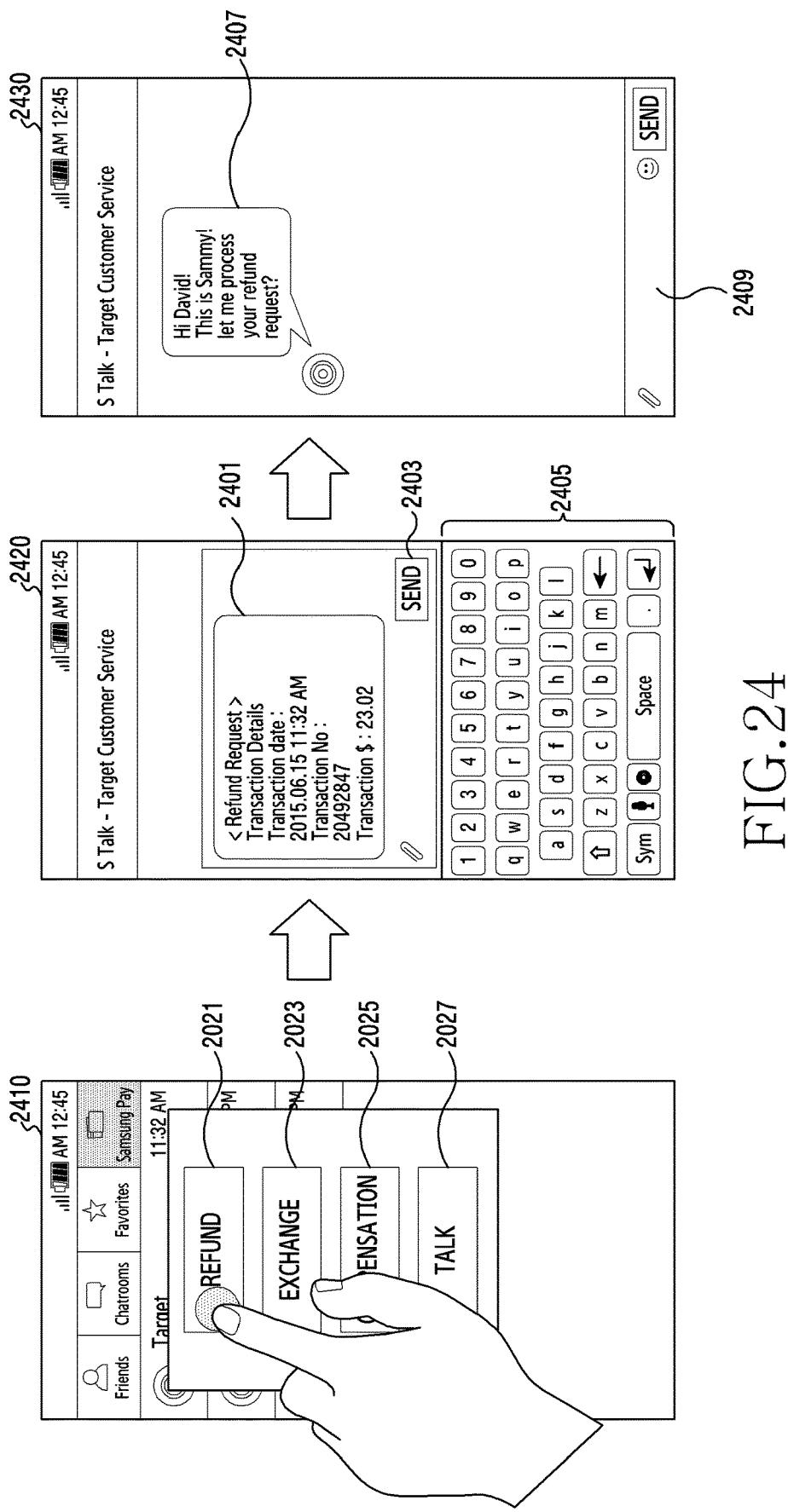
FIG. 24 illustrates an example of connecting an unmanned chatting service according to 'refund' service selection on a messenger application in an electronic device according to various embodiments of the present invention.

Referring to FIG. 23, in operation 2310, the electronic device detects 'refund' service selection in the post-payment service list. That is, the control unit 420 may detect a user's touch input, and determines the 'refund' service selection in the post-payment service list according to a position of the detected touch input. For example, particular post-payment service selection in the UI screen of the messenger application may be illustrated as shown in FIG. 24. In FIG. 24, the selection of the particular post-payment service according to the user's input may be displayed on a screen such as a first display 2410. For example, in the first screen 2410, the post-payment service list including refund 2021, exchange 2023, compensation 2025 and talk 2027 may be displayed in response to the payment history, and the user may select the 'refund' service through the screen touch input.

In operation 2320, the electronic device generates and transmits a message of a format predefined by the seller in response to the selected service. That is, the control unit 420 extracts information (e.g., payment date, payment number, payment amount, etc.) from corresponding payment history in response to the post-payment service selected through the user's touch input, and generates a message in the format predefined by the seller. In addition, the control unit 420 controls the communication unit 440 to transmit the generated message to the messenger server or the seller server. For example, generating and transmitting the message of the seller format in the messenger application may be shown as in FIG. 24. In FIG. 24, the message generated in the selected 'refund' service format may be displayed on the screen of a second screen 2420. For example, in the second screen 2420, according to the message format predefined by the seller for the selected 'refund' service, a message 2401 is generated to include information such as payment date, payment number, and payment amount required to process 'refund'. To transmit the generated message 2401, the user may select a send button 2403. According to other embodiments, the user may transmit the message generated in the format predefined by the seller by modifying it through an input interface 2405.

In operation 2330, the electronic device displays an unmanned chatting service connection screen. That is, the control unit 420 connects to the unmanned chatting service corresponding to the selected post-payment service, and controls to display the unmanned chatting service connection screen on the messenger application. For example, the unmanned chatting service connection screen in the UI screen of the messenger application may be displayed as shown in FIG. 24. In FIG. 24, the unmanned chatting service connection screen may be displayed on the screen of a third display 2430. For example, in the third screen 2430, the unmanned chatting service connection screen for the 'refund' procedure may be displayed. For example, the control unit 420 may determine an unmanned chatting robot corresponding to the 'refund' procedure, and control message transmission and reception to connect to the corresponding chatting bot. If the unmanned chatting service is started, a 'refund' procedure start message 2407 may be received from the corresponding chatting bot. The user may receive the unmanned chatting service by inputting a message to transmit through a message input window 2409. According to other embodiments, the chatting robot corresponding to the selected post-payment service may be determined at the messenger server. The unmanned chatting service connection may be fulfilled in response to the message transmitted in operation 2320. According to other embodiments, operation 2320 may be omitted, and operation 2330 may be performed to connect the unmanned chatting service.

Figure 25:
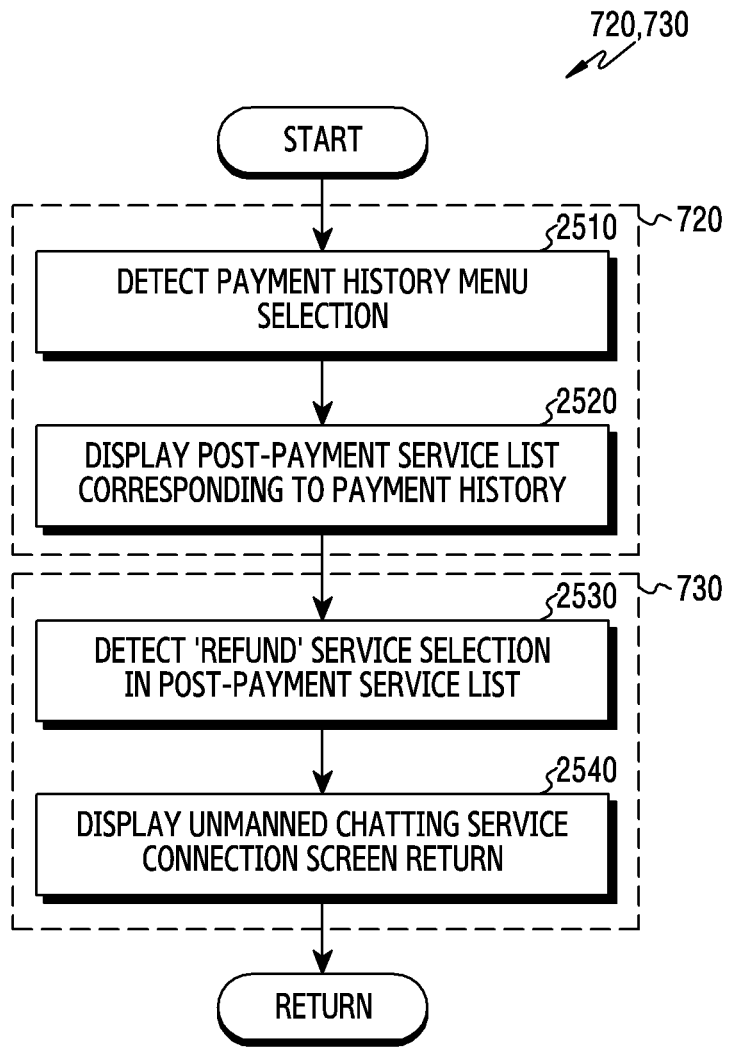
FIG. 25 illustrates a flowchart for displaying a post-payment service list and connecting an unmanned chatting service according to 'refund' service selection on a payment application in an electronic device according to various embodiments of the present invention.

FIG. 25 illustrates a flowchart for displaying a post-payment service list and connecting an unmanned chatting service according to 'refund' service selection on a payment application in an electronic device according to various embodiments of the present invention. FIG. 25 illustrates an operating method of the electronic device 101. If connecting the unmanned chatting service through the payment application in operations 720 and 730 of FIG. 7, the electronic device 101 may perform specific operations as the following descriptions.

Figure 26:
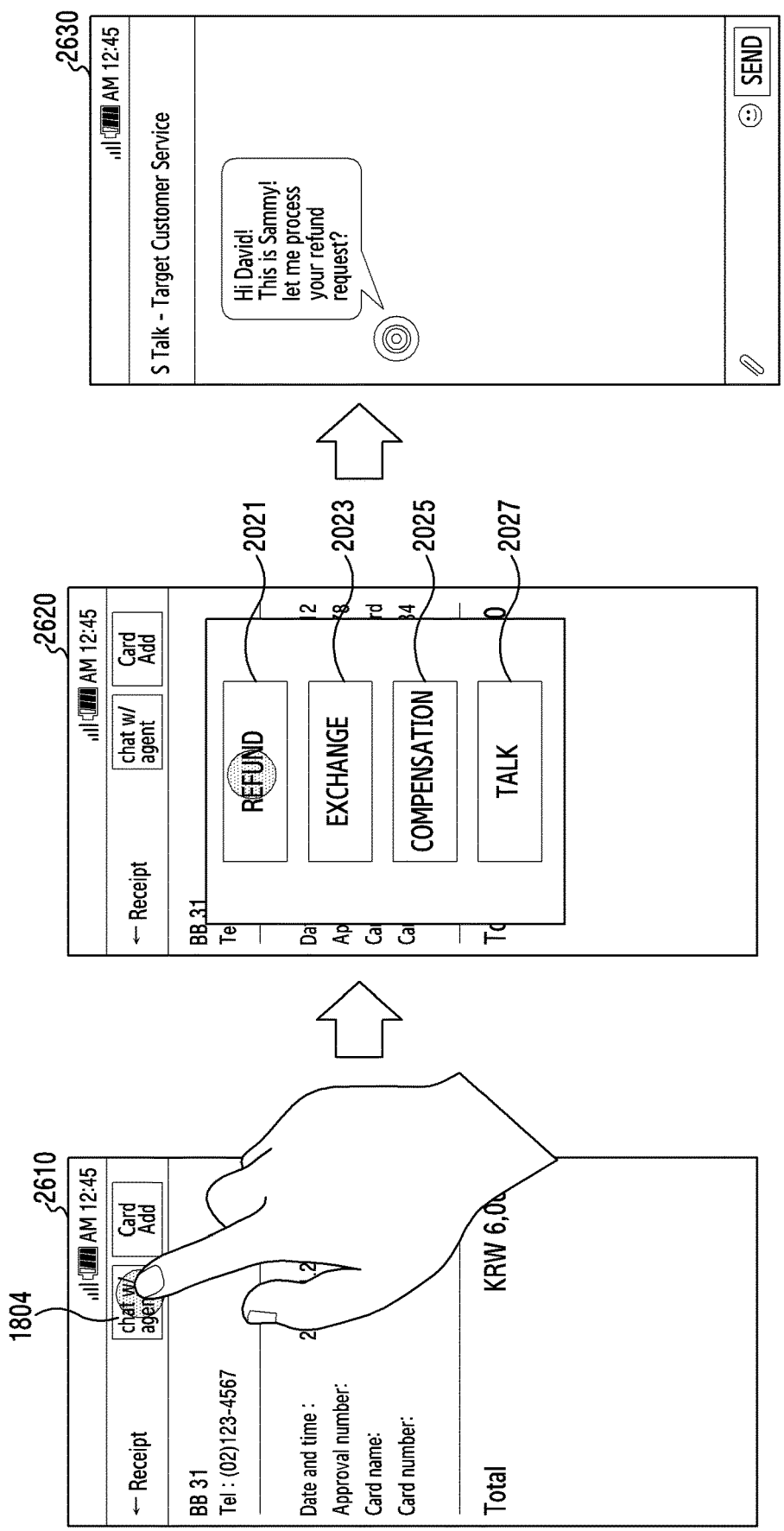
FIG. 26 illustrates an example of displaying a post-payment service list and connecting an unmanned chatting service according to 'refund' service selection on a payment application in an electronic device according to various embodiments of the present invention.

Referring to FIG. 25, in operation 2510, the electronic device detects post-payment service menu selection. That is, the control unit 420 may detect a user's touch input, and determines the post-payment service menu selection in the payment history UI screen of the payment application according to a position of the detected touch input. For example, the post-payment service menu selection in the UI screen of the payment application may be illustrated as shown in FIG. 26. In FIG. 26, the selection of the post-payment service menu according to the user input may be displayed on a screen such as a first screen 2610. For example, in the first screen 2610, the user may select a post-payment service menu 1804 on the screen which displays detailed payment history.

In operation 2520, the electronic device displays the post-payment service list corresponding to the payment history. That is, the control unit 420 controls to display the corresponding post-payment service list according to the post-payment service menu selection through the user's touch input. For example, the post-payment service list in the UI screen of the payment application may be illustrated as shown in FIG. 26. In FIG. 26, the post-payment service list may be displayed on the screen such as a second screen 2620.

In operation 2530, the electronic device detects 'refund' service selection in the post-payment service list. That is, the control unit 420 may detect a user's touch input, and determines the 'refund service selection in the post-payment service list according to a user's input position. For example, particular post-payment service selection in the UI screen of the payment application may be illustrated as shown in FIG. 26. In FIG. 26, the selection of the particular post-payment service according to the user's input may be displayed on the screen such as the second screen 2620. For example, in the second screen 2620, the post-payment service list including the refund 2021, the exchange 2023, the compensation 2025 and the talk 2027 may be displayed in response to the payment history, and the user may select the 'refund' service through the screen touch input.

In operation 2540, the electronic device displays an unmanned chatting service connection screen. That is, the control unit 420 connects to the unmanned chatting service corresponding to the selected post-payment service, and controls to display the unmanned chatting service connection screen on the messenger application or the payment application. For example, the unmanned chatting service connection screen in the UI screen of the messenger application may be displayed as shown in FIG. 26. In FIG. 26, the unmanned chatting service connection screen may be displayed on the screen of a third display 2630. For example, in the third screen 2630, the unmanned chatting service connection screen for the 'refund' procedure may be displayed. For example, the control unit 420 may determine an unmanned chatting robot corresponding to the 'refund' procedure, and control message transmission and reception to connect to the corresponding chatting bot. If the unmanned chatting service is started, a 'refund' procedure start message may be received from the corresponding chatting bot. The user may receive the unmanned chatting service by inputting a message to transmit through a message input window. According to other embodiments, the chatting robot corresponding to the selected post-payment service may be determined at the messenger server. The unmanned chatting service connecting operation may be fulfilled by transmitting a predefined message for the 'refund process' and responding to the message.

Figure 27:
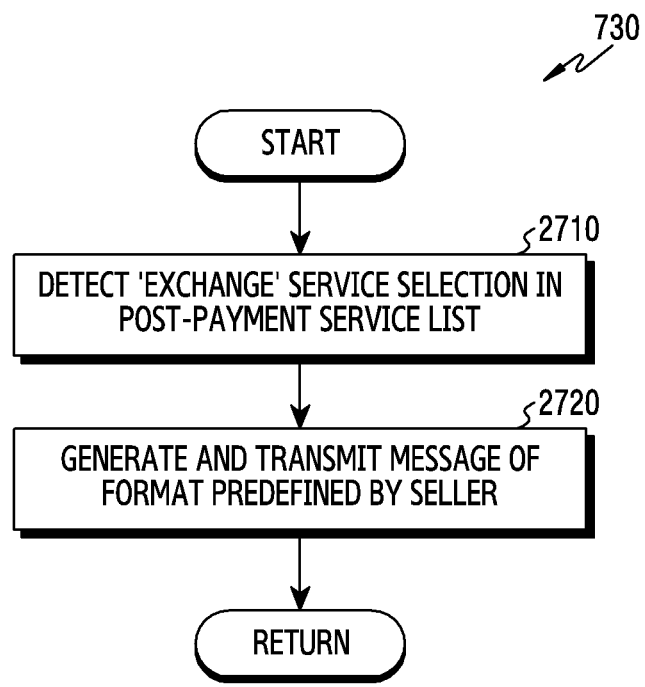
FIG. 27 illustrates a flowchart for connecting an unmanned chatting service according to 'exchange' service selection on a messenger application in an electronic device according to various embodiments of the present invention.

FIG. 27 illustrates a flowchart for connecting an unmanned chatting service according to 'exchange' service selection on a messenger application in an electronic device according to various embodiments of the present invention. FIG. 27 illustrates an operating method of the electronic device 101. If connecting the unmanned chatting service through the messenger application in operation 730 of FIG. 7, the electronic device 101 may perform specific operations as follows.

Figure 28:
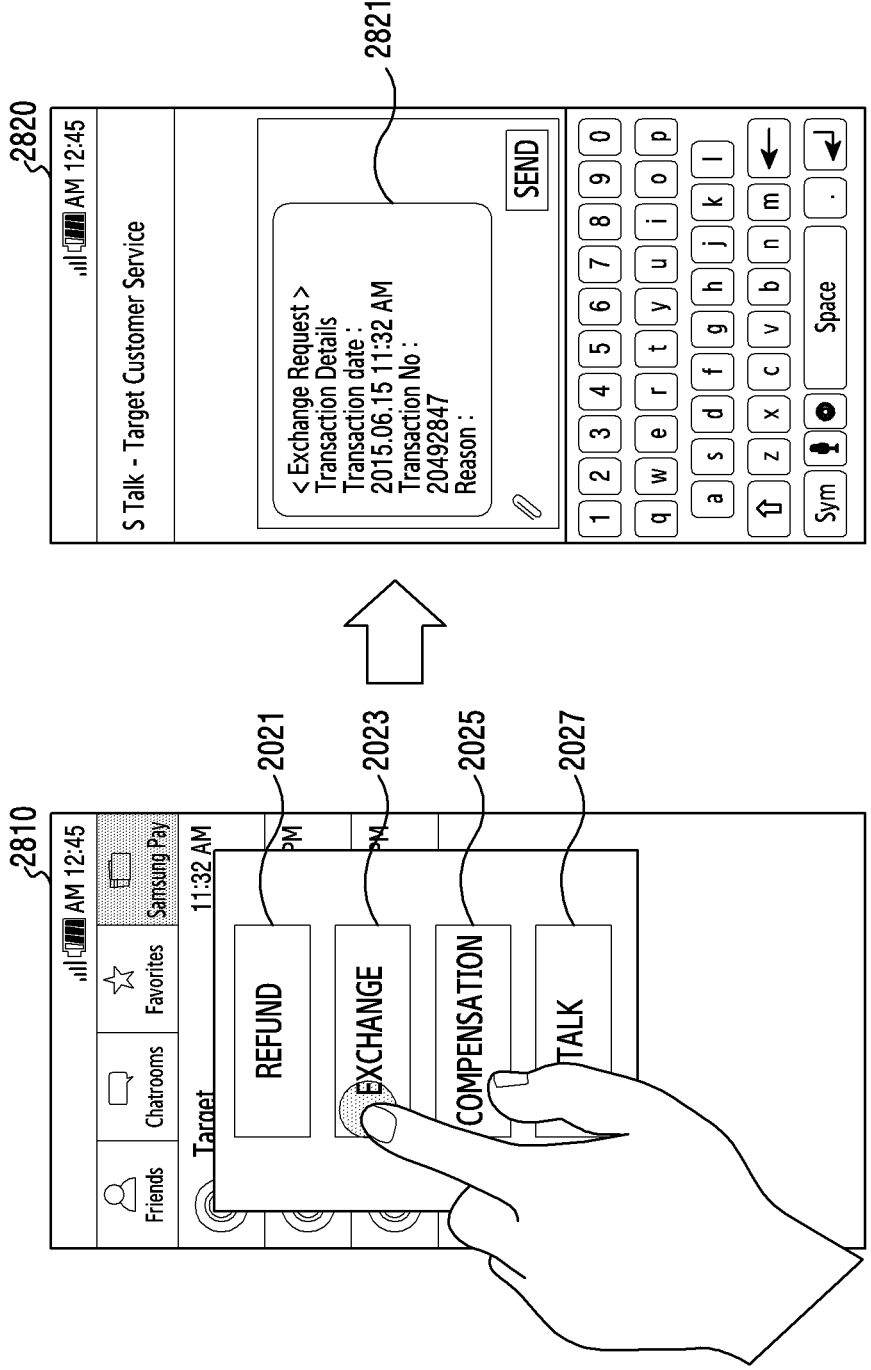
FIG. 28 illustrates an example of connecting an unmanned chatting service according to 'exchange' service selection on a messenger application in an electronic device according to various embodiments of the present invention.

Referring to FIG. 27, in operation 2710, the electronic device detects 'exchange' service selection in the post-payment service list. That is, the control unit 420 may detect a user's touch input, and determines the 'exchange' service selection in the post-payment service list according to a position of the detected touch input. For example, particular post-payment service selection in the UI screen of the messenger application may be shown as in FIG. 28. In FIG. 28, the selection of the particular post-payment service according to the user's input may be displayed on a screen such as a first screen 2810. For example, in the first screen 2810, the post-payment service list including the refund 2021, the exchange 2023, the compensation 2025 and the talk 2027 may be displayed in response to the payment history, and the user may select the 'exchange' service through the screen touch input.

In operation 2720, the electronic device generates and transmits a message of a format predefined by the seller. That is, the control unit 420 generates the message in the format predefined by the seller with respect to the selected post-payment service through the user's touch input, and controls the communication unit 440 to transmit the generated message to the messenger server or the seller server. For example, generating and transmitting the message of the seller format in the messenger application may be shown as in FIG. 28. In FIG. 28, the message generated in the selected 'exchange' service format may be displayed on the screen of a second screen 2820. For example, in the second screen 2820, according to the message format predefined by the seller for the selected 'exchange' service, a message 2821 is generated to include information such as payment date and payment number required to process 'exchange. The message 2821 may include detailed information such as size, color, and so on of a product to exchange. According to other embodiments, the user may transmit the message 2821 generated in the format predefined by the seller by modifying it through an input interface. For example, after the message of the format predefined by the seller is transmitted, a message for starting the unmanned chatting service may be received.

Figure 29:
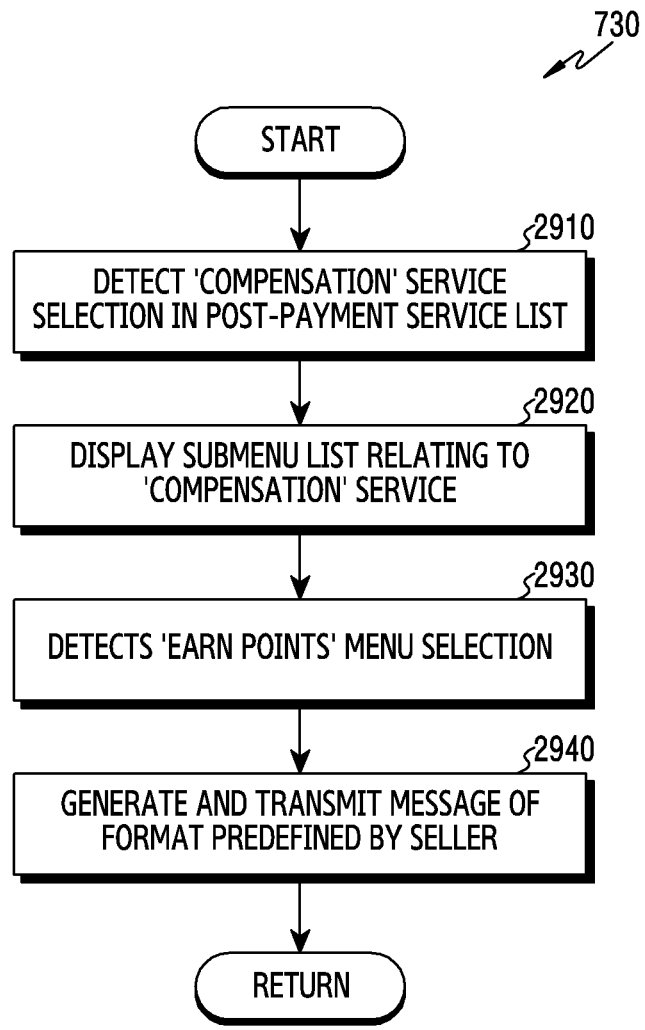
FIG. 29 illustrates a flowchart for connecting an unmanned chatting service according to 'compensation' service selection on a messenger application in an electronic device according to various embodiments of the present invention.

FIG. 29 illustrates a flowchart for connecting an unmanned chatting service according to 'compensation' service selection on a messenger application in an electronic device according to various embodiments of the present invention. FIG. 29 illustrates an operating method of the electronic device 101. If connecting the unmanned chatting service through the messenger application in operation 730 of FIG. 7, the electronic device 101 may perform specific operations as the following descriptions.

Figure 30:
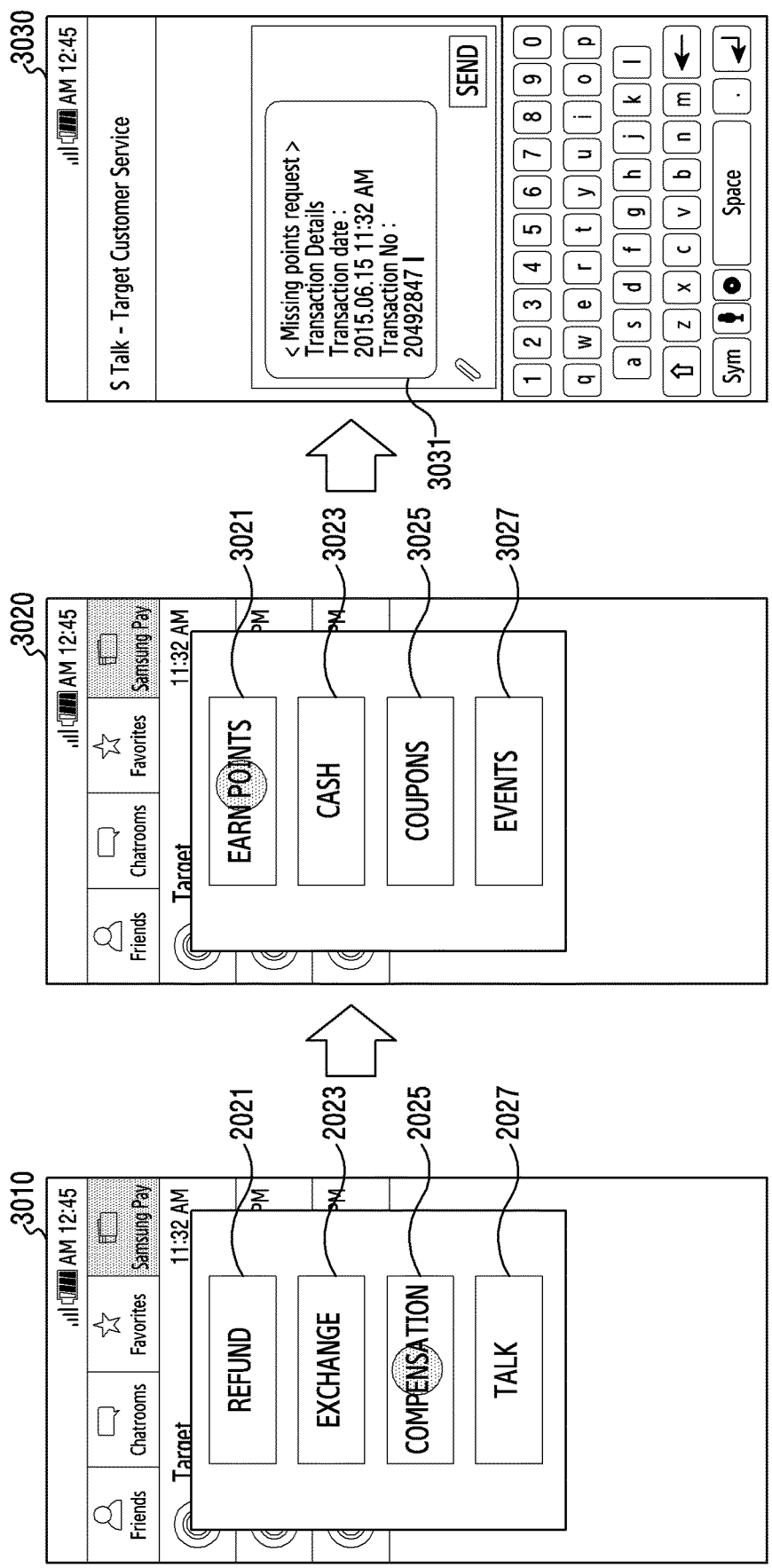
FIG. 30 illustrates an example of connecting an unmanned chatting service according to 'compensation' service selection on a messenger application in an electronic device according to various embodiments of the present invention.

Referring to FIG. 29, in operation 2910, the electronic device detects 'compensation' service selection in the post-payment service list. That is, the control unit 420 may detect a user's touch input, and determines the 'compensation' service selection in the post-payment service list according to a position of the detected touch input. For example, particular post-payment service selection in the UI screen of the messenger application may be shown as in FIG. 30. In FIG. 30, the selection of the particular post-payment service according to the user's input may be displayed on a screen such as a first screen 3010. For example, in the first screen 3010, the post-payment service list including the refund 2021, the exchange 2023, the compensation 2025 and the talk 2027 may be displayed in response to payment history, and the user may select the 'compensation' service through the screen touch input.

In operation 2920, the electronic device displays a submenu list relating to the selected post-payment service. That is, the control unit 420 controls to display the corresponding submenu list according to the post-payment service selection through the user's touch input. For example, the submenu list on the UI screen of the messenger application may be shown as in FIG. 30. In FIG. 30, a submenu list corresponding to the selected 'compensation' service may be displayed as the screen of a second screen 3020. For example, in the second screen 3020, the submenu list including earn points 3021, cash 3023, coupons 3025, and events 3027 may be displayed in response to the selected 'compensation' service.

In operation 2930, the electronic device detects 'earn points' menu selection in the submenu list. That is, the control unit 420 detects a user's touch input, and determines the 'earn points' menu selection in the submenu list according to a position of the detected touch input. For example, particular submenu selection in the UI screen of the messenger application may be shown as in FIG. 30. In FIG. 30, the selection of the submenu by the user's input may be displayed on the screen such as the second screen 3020. For example, in the second screen 3020, in response to the selected 'compensation' service, the submenu list including earn points 3021, cash 3023, coupons 3025, and events 3027 may be displayed, the user may select the 'earn points' service through a screen touch input.

In operation 2940, the electronic device generates and transmits a message of a format predefined by the seller. That is, the control unit 420 generates the message in the format predefined by the seller with respect to the submenu selected through the user's touch input, and controls the communication unit 440 to transmit the generated message to the messenger server or the seller server. For example, generating and transmitting the message of the seller format in the messenger application may be shown as in FIG. 30. In FIG. 30, the message generated in the selected 'earn points' service format may be displayed on the screen of a third screen 3030. For example, in the third screen 3030, according to the message format predefined by the seller for the selected 'earn points' menu, a message 3031 is generated to include information such as payment date and payment number required to process 'earn points'. According to other embodiments, the user may transmit the message 3031 generated in the format predefined by the seller by modifying it through an input interface. For example, after the message of the format predefined by the seller is transmitted, a message for starting the unmanned chatting service may be received.

Figure 31:
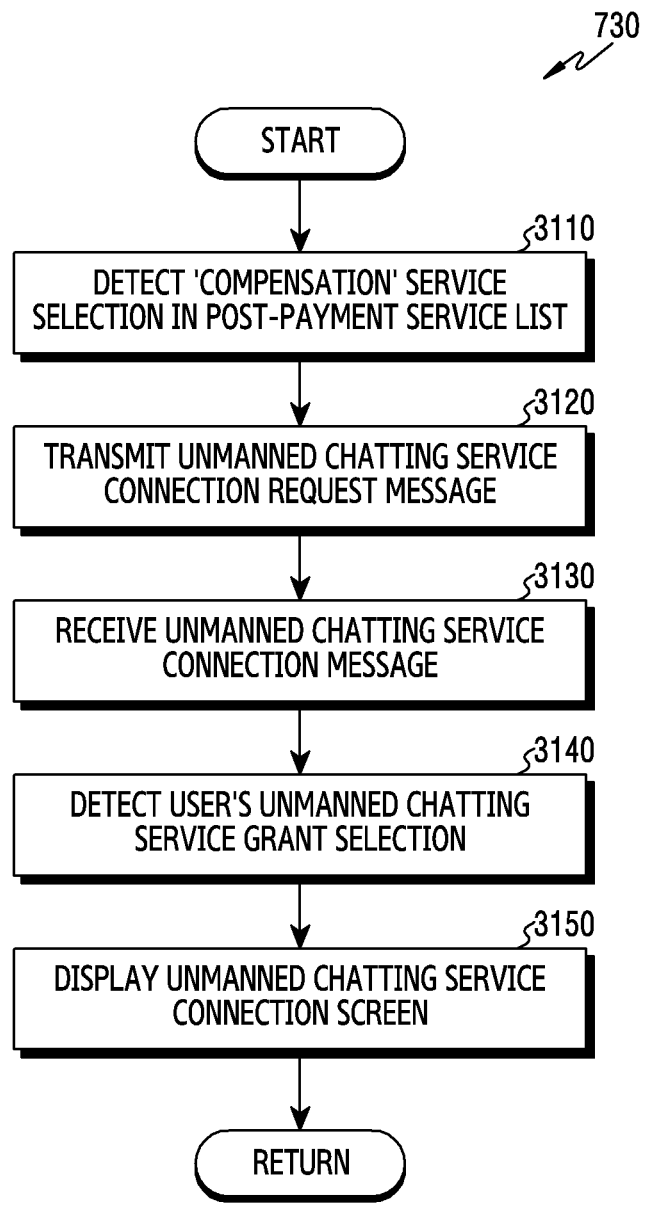
FIG. 31 illustrates a flowchart for connecting an unmanned chatting service according to 'talk' service selection on a messenger application in an electronic device according to various embodiments of the present invention.

FIG. 31 illustrates a flowchart for connecting an unmanned chatting service according to 'talk' service selection on a messenger application in an electronic device according to various embodiments of the present invention. FIG. 31 illustrates an operating method of the electronic device 101. If connecting the unmanned chatting service through the messenger application in operation 730 of FIG. 7, the electronic device 101 may perform specific operations as the following descriptions.

Figure 32:
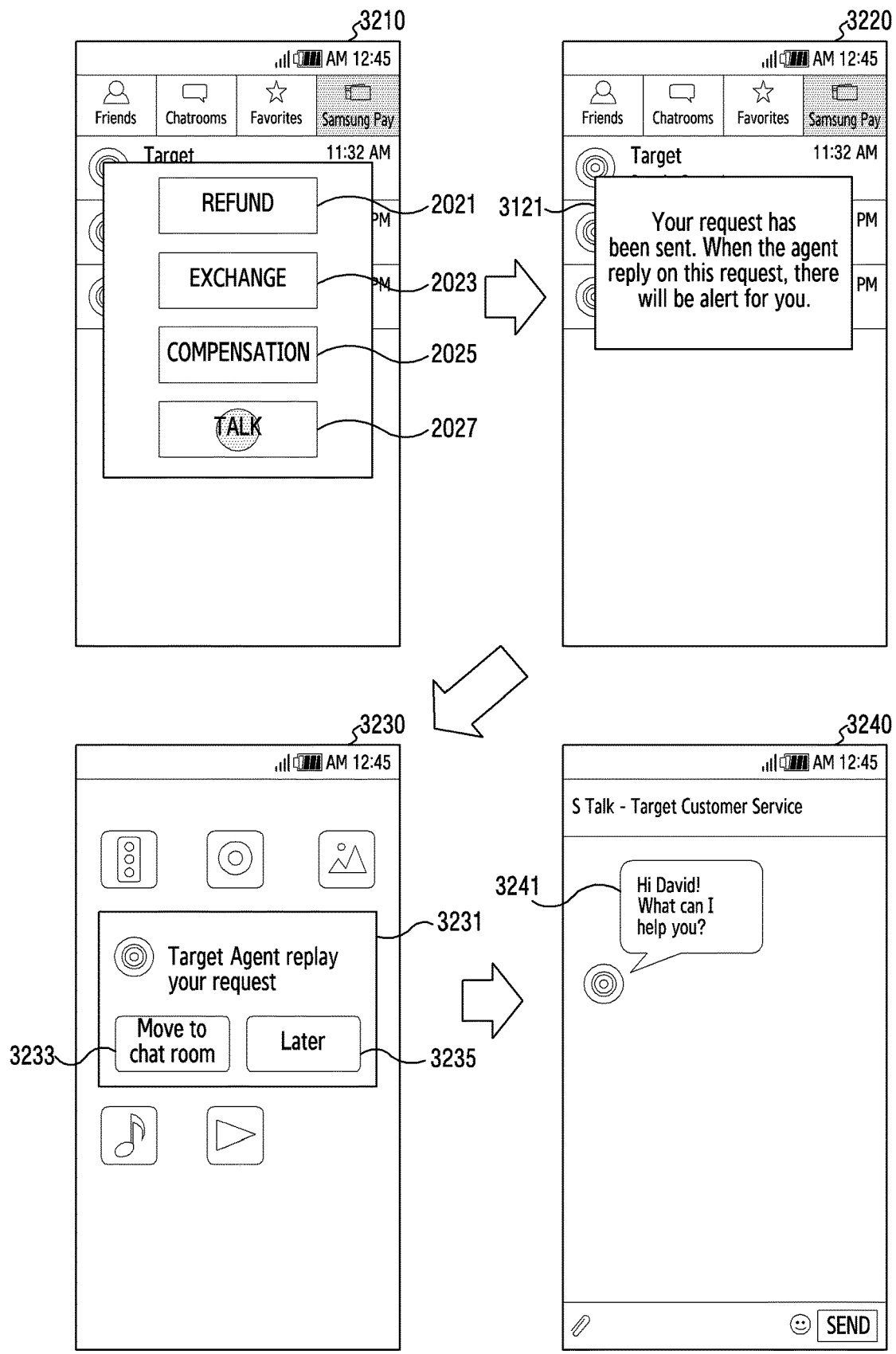
FIG. 32 illustrates an example of connecting an unmanned chatting service according to 'talk' service selection on a messenger application in an electronic device according to various embodiments of the present invention.

Referring to FIG. 31, in operation 3110, the electronic device detects 'talk' service selection in the post-payment service list. That is, the control unit 420 may detect a user's touch input, and determines the 'talk' service selection in the post-payment service list according to a position of the detected touch input. For example, particular post-payment service selection in the UI screen of the messenger application may be shown as in FIG. 32. In FIG. 32, the selection of the particular post-payment service according to the user's input may be displayed on a screen such as a first screen 3210. For example, in the first screen 3210, the post-payment service list including the refund 2021, the exchange 2023, the compensation 2025 and the talk 2027 may be displayed in response to payment history, and the user may select the 'talk' service through the screen touch input.

In operation 3120, the electronic device transmits an unmanned chatting service connection request message corresponding to the selected post-payment service. That is, the communication unit 440 transmits the connection request message to a chatting bot server which provides the corresponding unmanned chatting service according to the post-payment service menu selection through the user's touch input. For example, the control unit 420 may select the chatting robot corresponding to the selected post-payment service, and control the communication unit 440 to transmit the unmanned chatting service connection request message to the selected chatting bot server. According to other embodiments, the chatting robot corresponding to the selected post-payment service may be selected by the messenger server, the seller server or the chatting bot server. For example, the unmanned chatting service connection request process in the UI screen of the messenger application may be shown as in FIG. 32. In FIG. 32, the unmanned chatting service connection request corresponding to the selected 'talk' service is finished, the screen of a second screen 3220 may be displayed. For example, in the second screen 3220, if the unmanned chatting service connection request corresponding to the selected 'talk' service is finished, a request complete message 3221 may be displayed on the screen. For example, the unmanned chatting service request message may be generated and transmitted by including information predefined by a format predefined by the seller.

In operation 3130, the electronic device receives a message for the unmanned chatting service connection. That is, the communication unit 440 receives the message for the unmanned chatting service connection from the corresponding chatting bot server. For example, the message reception for the unmanned chatting service connection may be shown as in FIG. 32. In FIG. 32, a message reception notification for the unmanned chatting service connection may be displayed on the screen such as a third screen 3230. For example, in the third screen 3230, in response to the unmanned chatting service connection request, a message for the unmanned chatting service connection may be received from a corresponding chatting bot server, and a message reception notification 3231 for the unmanned chatting service connection may be displayed. For example, the message for the unmanned chatting service connection may be a push message.

In operation 3140, the electronic device detects selection which grants the unmanned chatting service. That is, the control unit 420 detects a user's touch input, and determines the chatting service grant selection in the message notification for the unmanned chatting service connection according to a position of the detected user's touch input. For example, the process of allowing the unmanned chatting service may be shown as in FIG. 32. In FIG. 32, the grant selection detection in a message reception notification window for the unmanned chatting service connection may be displayed as shown in the screen of a third display 3230. For example, in the third screen 3230, a message reception notification 3231 for the unmanned chatting service connection may be displayed by including a chatting start grant button 3233 and a refuse button 3235, and the user may allow the unmanned chatting service start by selecting the grant button 3233. According to other embodiments, the user may postpone the unmanned chatting service start by selecting the refuse button 3235 in a current state. According to other embodiments, if the user selects the refuse button 3235 and thus the unmanned chatting service start is postponed, operation 3130 and operation 3140 may be repeated. That is, the electronic device may repeatedly display the reception notification 3231 until the grant button 3235 is selected or during a predefined number of times.

In operation 3150, the electronic device displays an unmanned chatting service connection screen. That is, the control unit 420 connects to the unmanned chatting service corresponding to the selected post-payment service, and controls to display the unmanned chatting service connection screen on the messenger application or the payment application. For example, the unmanned chatting service connection screen in the UI screen of the messenger application may be displayed as shown in FIG. 32. In FIG. 32, the unmanned chatting service connection screen may be displayed on the screen of a fourth display 3240. For example, in the fourth screen 3240, the unmanned chatting service connection screen for the 'talk' procedure may be displayed. For example, the control unit 420 may determine an unmanned chatting robot corresponding to the 'talk' procedure, and control message transmission and reception to connect to the corresponding chatting bot. If the unmanned chatting service is started, a 'talk' procedure start message 3241 may be received from the corresponding chatting bot. The user may receive the unmanned chatting service by inputting a message to transmit through a message input window. According to other embodiments, the chatting robot corresponding to the selected post-payment service may be determined at the messenger server. The unmanned chatting service connection may be conducted by transmitting the predefined message for the 'talk' and responding to the message.

Figure 33:
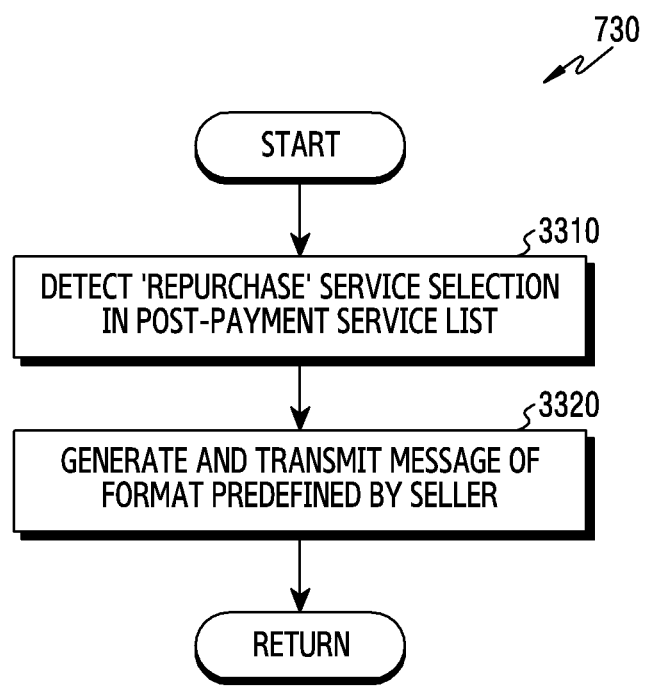
FIG. 33 illustrates a flowchart for connecting an unmanned chatting service according to 'repurchase' service selection on a messenger application in an electronic device according to various embodiments of the present invention.

FIG. 33 illustrates a flowchart for connecting an unmanned chatting service according to 'repurchase' service selection on a messenger application in an electronic device according to various embodiments of the present invention. FIG. 33 illustrates an operating method of the electronic device 101. If connecting the unmanned chatting service through the messenger application in operation 730 of FIG. 7, the electronic device 101 may perform specific operations as the following descriptions.

Figure 34:
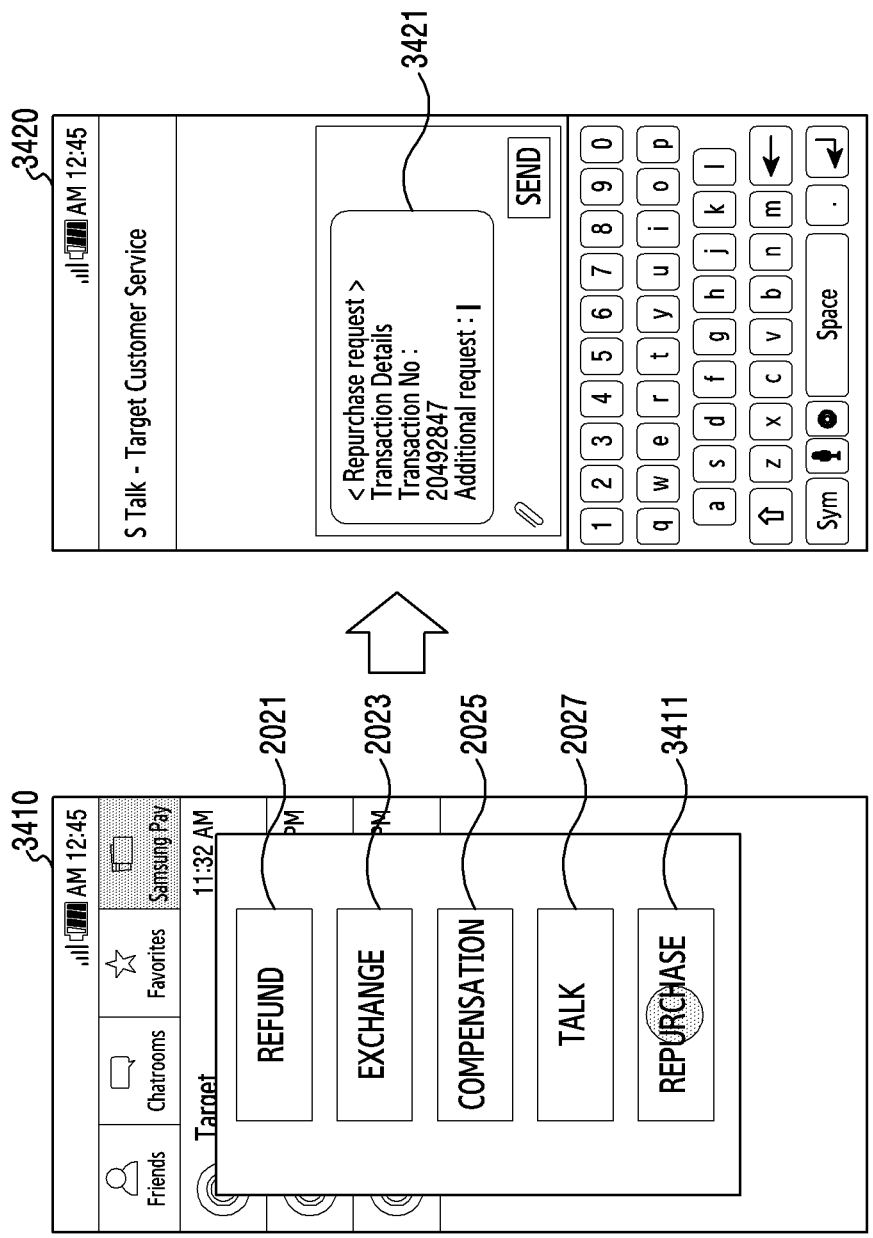
FIG. 34 illustrates an example of connecting an unmanned chatting service according to 'repurchase' service selection on a messenger application in an electronic device according to various embodiments of the present invention.

Referring to FIG. 33, in operation 3310, the electronic device detects 'repurchase' service selection in the post-payment service list. That is, the control unit 420 may detect a user's touch input, and determines the 'repurchase' service selection in the post-payment service list according to a position of the detected touch input. For example, particular post-payment service selection in the UI screen of the messenger application may be illustrated as shown in FIG. 34. In FIG. 34, the selection of the particular post-payment service according to the user's input may be displayed on a screen such as a first screen 3410. For example, in the first screen 3410, the post-payment service list including the refund 2021, the exchange 2023, the compensation 2025, the talk 2027, and repurchase 3411 may be displayed in response to payment history, and the user may select the 'repurchase' service through the screen touch input.

In operation 3320, the electronic device generates and transmits a message of a format predefined by the seller. That is, the control unit 420 generates the message in a format predefined by the seller with respect to the post-payment service selected through the user's touch input, and controls the communication unit 440 to transmit the generated message to the messenger server or the seller server. For example, generating and transmitting the message of the seller format at n the messenger application may be shown as in FIG. 34. In FIG. 34, the message generated in the selected 'repurchase' service format may be displayed on the screen of a second screen 3420. For example, in the second screen 3420, according to the message format predefined by the seller for the selected 'repurchase' service, a message 3421 is generated to include information such as payment time information, payment number, additional purchase amount, required for processing 'repurchase'. The message 3421 may include detailed information such as size, color and so on, of the product for the repurchase. According to other embodiments, the user may transmit the message 3421 generated in the format predefined by the seller by modifying it through an input interface. For example, after the message of the format predefined by the seller is transmitted, a message for starting the unmanned chatting service may be received.

According to the above-mentioned embodiments of FIG. 23 through FIG. 34, the unmanned chatting service corresponding to the post-payment service may be connected. According to other embodiments, to receive the post-payment service using the payment history of the payment application, means such as SMS or telephone connection may be used in addition to the unmanned chatting service. For example, by considering a network environment (e.g., data network connection status, etc.) and the terminal state (e.g., terminal battery remaining amount, etc), the electronic device 101 may display adequate means for receiving the post-payment service on the screen. For example, if the electronic device 101 is not connected to a data network, if the post-payment service such as 'refund' is selected, the unmanned chatting service may not be provided and accordingly the electronic device 101 may display a notification message which suggests SMS or voice connection.

Figure 35:
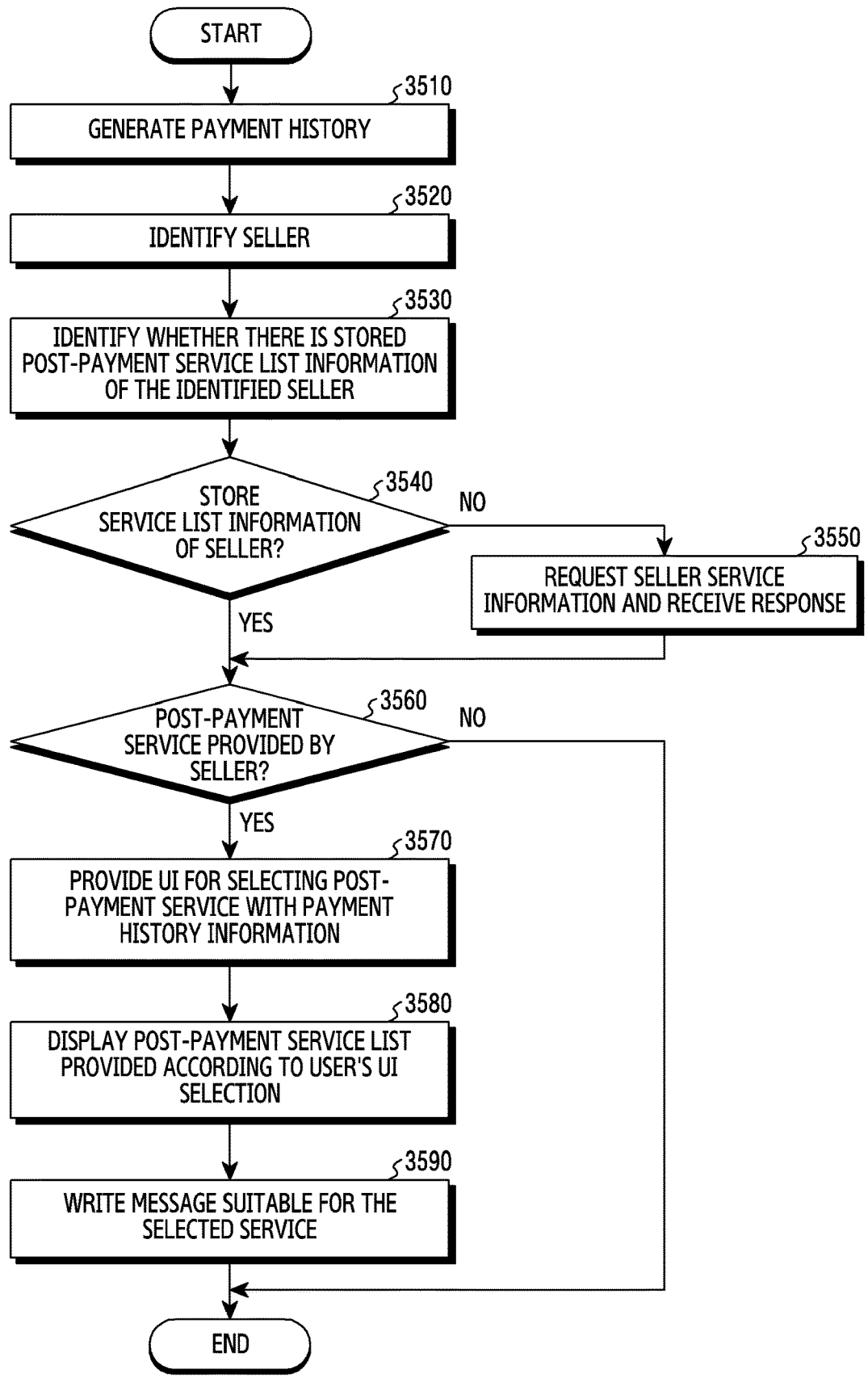
FIG. 35 illustrates an example of providing a post-payment service based on payment history information in an electronic device according to various embodiments of the present invention.

FIG. 35 illustrates an example of providing a post-payment service based on payment history information in an electronic device according to various embodiments of the present invention. FIG. 35 illustrates an operating method of the electronic device 101.

Referring to FIG. 35, in operation 3510, the electronic device may generate payment history. For example, an application (e.g., SamsungPay, Apple Pay, housekeeping book app, etc.) which manages payment information may be installed on the electronic device, and the payment history may occur through such a payment application.

In operation 3520, the electronic device may identify a seller of the generated payment history. That is, if the payment history occurs, the application of the electronic device may receive user's payment history information of the electronic device. The payment history information may include information for identifying the seller.

In operation 3530, the electronic device may identify whether there is stored post-payment service list information of the identified seller. That is, the control unit 420 may identify the seller based on the information for identifying the seller in the payment history, and identify whether the post-payment service list information provided by the identified seller is stored.

In operation 3540, the electronic device identifies whether service list information of the seller is stored. That is, the control unit 420 determines whether the post-payment service list information provided from the identified seller is stored in the storage unit 430. For example, if the service list provided from the seller is not stored in the storage unit 430, operation 3550 is performed. For example, if the service list provided from the seller is stored in the storage unit 430, operation 3560 is performed.

In operation 3550, the electronic device may request service information provided by the seller and receive a response. That is, if the service list provided from the seller is not stored in the storage unit 430, the control unit 420 may control the communication unit 440 to receive the post-payment service information from the seller server or other external device. The control unit 420 may request the post-payment service information from the seller server 109 or the other external device (which operates in association with the application which manages the payment history information).

In operation 3560, the electronic device determines whether there is a post-payment service provided by the seller. That is, if the post-payment service list provided by the seller is stored in the storage unit 430 but there is no post-payment service provided by the seller, the control unit 420 may determine the seller not supporting the post-payment service. Accordingly, the electronic device may identify whether the seller supports the post-payment service, and finish the process if not supporting.

In operation 3570, the electronic device may provide a UI for selecting the post-payment service together with payment history information. That is, if the seller provides the post-payment service, the control unit 420 may control to display the UI for requesting the post-payment service with the payment history information.

In operation 3580, the electronic device displays a post-payment service list provided according to the user UI selection. That is, the control unit 420 may detect the user UI selection, and control to display the post-payment service list corresponding to the user's selection. The control unit 420 may control to display the post-payment service list corresponding to the user's UI selection.

In operation 3590, the electronic device writes a message suitable for the post-payment service selected by the user. That is, the control unit 420 generates the message based on the payment history information according to the service selected by the user. For example, the control unit 420 may generate the payment history-based message for the service according to the user's selection, and process a user's service request by transmitting the message directly to a messenger account of the seller or providing the unmanned chatting service.

The methods according to the embodiments disclosed in the claims or the specification of the present invention may be implemented in software, hardware, or a combination of hardware and software.

Such software may be stored in a computer readable storage medium. The computer readable storage medium stores at least one program including instructions, when executed by at least one program (software module), or at least one processor in the electronic device, which cause the electronic device to fulfill the method of the present invention.

Such software may be stored in the form of a volatile or non-volatile storage such as ROM, in the form of memory such as RAM, memory chips, devices or integrated circuits, or on an optically or magnetically readable medium such as CD-ROM, DVDs, or magnetic disk or magnetic tape.

The storage devices and the storage media are embodiments of machine-readable storage means which are suitable for storing a program or programs including instructions which, when executed, implement embodiments. Embodiments provide a program including code for implementing an apparatus or a method as claimed in any one of claims of the present specification, and a machine-readable storage medium for storing such a program. Further, such programs may be electronically conveyed via any medium such as a communication signal carried over a wired or wireless connection, and embodiments appropriately include equivalents.

In the specific embodiments, the elements included in the invention are expressed in a singular or plural form according to the suggested specific embodiment. However, the singular or plural expression is appropriately selected according to a proposed situation for the convenience of explanations, the above-stated embodiments are not limited to a single element or a plurality of elements, and the elements expressed in the plural form may be configured as a single element, or the elements expressed in the singular form may be configured as a plurality of elements.

Meanwhile, while the specific embodiment has been described in the explanations of the invention, it will be noted that various changes may be made therein without departing from the scope of the technical concept implied by various embodiments. Thus, the scope of the present invention is not limited and defined by the described embodiment, and is defined by the following claims and their equivalents.

The invention claimed is:

1. An operating method of an electronic device, comprising:
    displaying at least one payment history;
    identifying a payment history among the at least one payment history based on a first user input;
    displaying at least one post-payment service corresponding to the identified payment history;
    identifying a post-payment service among the at least one post-payment service based on a second user input;
    identifying a first server corresponding to the identified post payment service, wherein the first server provides a first unmanned chatting service to the electronic device;
    establishing a first communication link based on transmitting a first connection request message to the first server;
    displaying a first user interface for communicating with the first server, wherein the first user interface includes at least one of message by the first unmanned chatting service;
    identifying a second server by analyzing a text among the at least one of messages displayed via the first user interface, wherein the text is related to a second unmanned chatting service provided from the second server;
    establishing a second communication link based on transmitting a second connection request message to the second server; and
    displaying a second user interface which enables the electronic device to communicate with the second server.

2. The method of claim 1, wherein establishing the first communication link further comprises:
    transmitting a predefined message, according to the identified post-payment service.

3. The method of claim 2, wherein the predefined message is generated according to a predefined format, based on information extracted from the identified payment history in response to the identified post-payment service.

4. The method of claim 2, wherein the predefined message comprises at least one information of a payment date, a payment number, a payment method, a payment amount, a repurchase amount, a product size, and a product color in response to the identified post-payment service.

5. The method of claim 1, wherein the at least one post-payment service is determined based on information on a seller of the identified payment history.

6. The method of claim 1, wherein the at least one post-payment service comprises at least one of refund, exchange, compensation, repurchase, talk, customer satisfaction survey, order confirmation, and shipping confirmation.

7. The method of claim 1, wherein the at least one payment history and the at least one post-payment service are displayed in an execution window of a payment application or a messenger application.

8. The method of claim 1, wherein the identifying the first server corresponding to the identified post payment service comprises determining an unmanned chatting service to be connected based on the identified post-payment service.

9. The method of claim 1, wherein the identified payment history and the at least one post-payment service are displayed if selecting a notification or a short message service (SMS) received after payment.

10. An electronic device comprising:
    a communication module;
    a display; and
    a processor operably connected to the display and the communication module, wherein the processor is configured to:
        display, through the display, at least one payment history;
        identify a payment history among the at least one payment history based on a first user input received through the display;
        display, through the display, at least one post-payment service corresponding to the identified payment history;
        identify a post-payment service among the at least one post-payment service based on a second user input received through the display; and
        identify a first server corresponding to the identified post payment service, wherein the first server provides a first unmanned chatting service to the electronic device;
        establish, by the communication module, a first communication link based on transmitting a first connection request message to the first server;
        display, through the display a first user interface for communicating with the first server, wherein the first user interface includes at least one of message by the first unmanned chatting service;
        identify a second server by analyzing a text among the at least one of messages displayed via the first user interface, wherein the text is related to a second unmanned chatting service provided from the second server;
        establish, by the communication module, a second communication link based on transmitting a second connection request message to the second server; and
        display, through the display, a second user interface which enables the electronic device to communicate with the second server.

11. The electronic device of claim 10, wherein the processor is further configured to:
    transmit a predefined message, according to the identified post-payment service.

12. The electronic device of claim 11, wherein the processor is further configured to:

generate the predefined message according to a predefined format, based on information extracted from the identified payment history in response to the identified post-payment service.

13. The electronic device of claim 11, wherein the predefined message comprises at least one information of a payment date, a payment number, a payment method, a payment amount, a repurchase amount, a product size, and a product color in response to the identified post-payment service.

14. The electronic device of claim 10, wherein the processor is further configured to determine the at least one post-payment service based on information on a seller of the identified payment history.

15. The electronic device of claim 10, wherein the at least one post-payment service comprises at least one of refund, exchange, compensation, repurchase, talk, customer satisfaction survey, order confirmation, and shipping confirmation.

16. The electronic device of claim 10, wherein the at least one payment history and the at least one post-payment service are displayed in an execution window of a payment application or a messenger application.

17. The electronic device of claim 10, wherein the at least one payment history and the at least one post-payment service are displayed if selecting a notification or a short message service (SMS) received after payment.

18. The electronic device of claim 10,
wherein the processor is further configured to determine an unmanned chatting service to be connected based on the identified post-payment service.

* * * * *